(12) United States Patent
Singh et al.

(10) Patent No.: US 12,513,105 B1
(45) Date of Patent: Dec. 30, 2025

(54) INLINE DYNAMIC NETWORK ADDRESS AND PORT TRANSLATION (NAPT)

(71) Applicant: Juniper Networks, Inc., Sunnyvale, CA (US)

(72) Inventors: Jitendra Kumar Singh, Bangalore (IN); Andrzej W. Szyszko, Holden, MA (US); Rohan Meegada, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 13 days.

(21) Appl. No.: 18/759,865

(22) Filed: Jun. 29, 2024

(51) Int. Cl.
*H04L 61/255* (2022.01)
*H04L 45/00* (2022.01)
*H04L 45/745* (2022.01)
*H04L 47/32* (2022.01)
*H04L 61/2514* (2022.01)
*H04L 61/2517* (2022.01)

(52) U.S. Cl.
CPC ............ *H04L 61/255* (2013.01); *H04L 45/72* (2013.01); *H04L 45/745* (2013.01); *H04L 47/32* (2013.01); *H04L 61/2514* (2013.01); *H04L 61/2517* (2013.01)

(58) Field of Classification Search
CPC ..... H04L 61/255; H04L 45/72; H04L 45/745; H04L 47/32; H04L 61/2514; H04L 61/2517
See application file for complete search history.

(56) References Cited

U.S. PATENT DOCUMENTS

| | | | |
|---|---|---|---|
| 7,480,305 B1 * | 1/2009 | Somasundaram .. | H04L 61/2517 370/466 |
| 8,650,279 B2 * | 2/2014 | Mehta ................... | H04W 8/082 709/227 |
| 8,701,179 B1 * | 4/2014 | Penno .................... | H04L 63/02 709/227 |
| 9,083,587 B2 * | 7/2015 | Babu .................... | H04L 61/2514 |
| 9,351,324 B2 * | 5/2016 | Krishna ................ | H04W 76/12 |
| 10,805,408 B2 * | 10/2020 | Hammer ............... | H04M 15/41 |
| RE49,926 E * | 4/2024 | Babu ...................... | H04L 61/503 |

* cited by examiner

*Primary Examiner* — Alex Tran
(74) *Attorney, Agent, or Firm* — John C. Pokotylo; Pokotylo Patent Services

(57) ABSTRACT

NAPT services are provided, preferably inline on the "fast path" on bundled links. One of the member links is selected as "anchor." When uplink traffic arrives on the any of the member links, the link's forwarding path looks to the NAPT binding entry in its forwarding path. If a binding entry is found, NAPT is performed in an inline manner (without requiring any other device), and the traffic is forwarded. If a binding entry is not found, the received traffic is forwarded to the anchor. The anchor allocates the port and creates a NAPT binding on all the member links. Downlink traffic performs lookup for reverse NAPT binding entry in the link's forwarding path. If a matching entry is found, the forwarding path of the link performs NAPT. If there is no matching binding entry, the downlink traffic is dropped. Stale binding entries are "aged out", enabling dynamic NAPT.

20 Claims, 9 Drawing Sheets

INLINE DYNAMIC NETWORK ADDRESS AND PORT TRANSLATION (NAPT)

§ 1. BACKGROUND OF THE INVENTION

§ 1.1 Field of the Invention

The present application concerns communications networks and devices used in communications networks. More specifically, the present application concerns improving existing network address and port translation (NAPT).

§ 1.2 Background Information

§ 1.2.1 Network Address and Port Translation (NAPT)

Network Address and Port Translation (NAPT), also known as "Port Address Translation" (PAT) or "IP Masquerading," is a technique used in computer networking to allow multiple devices within a private network to share a single public Internet Protocol (IP) address for accessing resources on the Internet. Further, with NAPT, both the IP addresses and the port numbers of the internal devices are translated. The primary goal of NAPT is to conserve public IP addresses. With the proliferation of devices accessing the internet, there is a shortage of public IP addresses, especially IPv4 addresses. NAPT enables many devices with private IP addresses to access resources on the Internet using a single public IP address. This allows multiple devices with private IP addresses to communicate with external servers using the same public IP address, with each device distinguished by its unique combination of source IP address and source port. NAPT operates at the network layer (Layer 3) and transport layer (Layer 4) of the OSI model, providing a form of address translation that helps conserve public IP addresses and enhances security by hiding the internal network structure from external entities.

NAPT is commonly used in home and small office networks where multiple devices (such as computers, smartphones, and IoT devices) need internet access, but where a single public IP address is provided by the Internet service provider (ISP). NAPT is also used in enterprise networks to enable Internet connectivity for internal users while preserving public IP addresses. Another use of NAPT is in Carrier-Grade Network Address Translation (CG NAT). CG NAT is a type of NAT (Network Address Translation) technique used by Internet Service Providers (ISPs) to manage the limited availability of public IPv4 addresses. CG NAT is an extension of traditional NAT, but it's implemented at a larger scale by ISPs to accommodate the growing number of Internet-connected devices. Unlike traditional NAT, which might be implemented at the level of a home router or small office, CG NAT is deployed by ISPs to manage address translation for thousands or even millions of subscribers. As with NAPT, CG NAT translates both the source IP address and source port number of outgoing packets from subscribers' devices. When a packet from a subscriber's device enters the ISP's network, the CG NAT device replaces the private source IP address and port with a public IP address and port from its pool. This translation allows the packet to traverse the Internet and reach its destination, and for the destination device to send data back. Similar to NAPT, CG NAT uses port multiplexing to allow multiple devices within a subscriber's network to share the same public IP address. Each device's traffic is distinguished by the combination of its private IP address and a unique port number assigned by the CG NAT device. CG NAT is often viewed as a temporary solution to address the IPV4 address exhaustion problem until widespread adoption of IPV6, which provides a vastly larger address space, thereby allowing every device to have a unique public IP address.

As noted above, NAPT translates both the source IP address and the source port number of outgoing packets from devices within the private network. This translation occurs as packets leave the internal network and head towards the Internet. These packets may be referred to collectively as "uplink traffic" or "outgoing traffic". The translation maps each private IP address and port to a unique public IP address and port number.

NAPT devices maintain tables to keep track of the translation mappings. These tables record the source IP address, source port, destination IP address, destination port, and the associated translated IP address and port. This stateful inspection allows the NAPT device to accurately translate incoming packets (which may be referred to as "downlink traffic" or "incoming traffic") and forward them to the correct internal device.

NAPT also enhances network security by effectively hiding the internal network structure from external entities. External parties see only the public IP address and port numbers assigned by the NAPT device, making it challenging for attackers to directly target individual devices within the private network.

Further, NAPT configurations are flexible. Administrators can configure port forwarding rules to allow inbound traffic to reach specific devices within the private network. Additionally, some NAPT implementations support protocols like File Transfer Protocol (FTP) and Session Initiation Protocol (SIP), which require special handling due to their use of multiple ports for data transfer.

The NAPT device maintains a binding table, also known as a NAPT table or translation table, which contains the mappings between internal and external addresses and ports. This table keeps track of active connections and allows the NAPT device to accurately translate incoming and outgoing traffic. Further, NAPT devices typically have timeouts associated with bindings to manage inactive or expired connections. When a binding reaches its timeout period without any activity, it is removed from the binding table, freeing up resources for new connections. This cleanup process helps ensure efficient utilization of resources and prevents the table from becoming overloaded with stale entries. This dynamic allocation and reallocation of IP addresses and port numbers may be referred to as "dynamic NAPT".

§ 1.2.1.1 NAPT Operations for Outgoing (Uplink) Traffic and Incoming (Downlink) Traffic Regarding outgoing (uplink) traffic, when a device within the private network initiates communication with a destination on the internet, the NAPT device creates a binding entry to track the source IP address and port of the internal device, as well as the destination IP address and port. It then translates the source IP address and port to a unique combination of a public IP address and port from its pool and forwards the packet to its destination. An example illustrating the processing of outgoing (uplink) traffic is described in § 1.2.1.1.1 below, with reference to FIG. 1. Regarding incoming (downlink) traffic, when a response packet returns from the destination on the internet, the NAPT device uses the binding entry to determine which internal device to forward the packet to. It translates the destination IP address and port (which are the public IP address and port) back to the corresponding private IP address and port before delivering the packet to the appropriate internal device. An example illustrating the processing of incoming (downlink) traffic is described in § 1.2.1.1.2 below, with reference to FIG. 2.

§ 1.2.1.1.1 Example of Uplink Traffic Processing

FIG. 1 illustrates what is occurring at the packet level for uplink (outbound) traffic. The router 110 is serving as the translation device, and is configured with a dynamic NAPT which translates any IP address on the Inside network (10.6.6.0/24) 120 to the IP address 32.8.2.66. When packets are translated, the router 110 makes note of the attributes of the original and translated packet in the router's Translation Table 115.

Hosts 122a, 122b and 122c each send a packet. They each use their own, unique Private IP address as the Source IP address, and they each randomly select a Source Port.

There are approximately 60,000 port numbers that can be chosen, and it is entirely feasible for two different hosts to randomly select the same source port (as is the case with Host 122b and Host 122c).

Notice the configuration of the dynamic NAPT does not include specifying a port number. Even though the ports are not explicitly set in the router's configuration, this translation is still classified as a NAPT because the port is dynamically changed by the router 110.

In the example above, upon reception of each packet, the router 110 translates the source IP address of each packet to 32.8.2.66 (as explicitly configured), and randomly selects a new, unique source port number for each packet (7777, 8888, and 9999). The router 110 translated the port and selected the new source port (dynamic).

Each specific mapping is recorded in the router's translation (also referred as "binding") table 115. This translation table 115 will be used to "un-translate" the response (incoming, or downlink) packets when they return from the Internet.

§ 1.2.1.1.2 Example of Downlink Traffic Processing

Assume that the two webservers 130a and 130b respond to the three packets illustrated in the FIG. 1. FIG. 2 illustrates downlink (inbound) response flow. The response traffic from the webservers 130a and 130b simply reverses the source and destination from the initial packet. Each webserver 130a/130b sends the response traffic to the destination of the shared IP address (32.8.2.66), with the destination port number which the router had selected in the original outbound traffic.

When the downlink packets arrive on the router 110, the router 110 matches them against the translation table to know how to "un-translate" the packet back to their original attributes to get them to the appropriate host. In this example:
  i) the response packet sent to 32.8.2.66:7777 is forwarded to Host A (10.6.6.61:2222);
  ii) the response packet sent to 32.8.2.66:8888 is forwarded to Host B (10.6.6.62:3333); and
  iii) the response packet sent to 32.8.2.66:9999 is forwarded to Host C (10.6.6.63:3333).

§ 1.2.1.2 Re-Randomizing the Source Port

In the example above, the router 110 selected a new, random source port for the outbound packet. This re-randomizing of the source port allows successful communication through a dynamic NAPT. If the router 110 had not re-randomized the source port number, the outbound post-translation packets from Host 112b and Host 112c would have looked identical (they both would have had a Source IP of 32.8.2.66 and a Source port of 3333). This, in turn, means the response traffic for both packets from the 28.2.4.6 server 130b would have looked identical (the Destination IP would have been 32.8.2.66 and the Destination port would have been 3333). If the source ports were not re-randomized by the translation device, when the identical packets arrive, the router 110 would have no way of distinguishing which packet should be untranslated to Host 122b (10.6.6.62) or which should be translated to Host 122c (10.6.6.63). As a result, the router 110 would have dropped both packets. In fact, this would cause packets to drop anytime two hosts 122 happen to pick the same source port, which happens often enough that no host would be content with the connectivity (or lack thereof) provided through a dynamic NAPT. Therefore, the router 110 ensures every packet sent through a dynamic NAPT uses a unique source port number so that the return packets to be distinguishable from one another. This, in turn, allows the router 110 to forward the return traffic to the appropriate host.

Some NAPT devices assure unique source ports by re-randomizing the source port for all connections when performing a dynamic NAPT. Some NAPT devices do this by re-randomizing the source port only when duplicate ports are chosen by the inside hosts. Regardless of the method used, so long as each connection's packets can be identified by both unique IP Address and port, for both Source and Destination, the response traffic can be successfully un-translated to the appropriate initial host.

§ 1.2.1.3 Unidirectional

As discussed before, a dynamic NAPT allows many internal hosts 122 to share the same the same public IP address. One of the side effects of multiple hosts 122 sharing a single IP address is the translation only works in one direction. In the examples discussed above with reference to FIGS. 1 and 2, hosts 112a, 112b, and 112c initiated some traffic to external hosts 130a and 130b. When the external hosts 130a and 130b responded, the router 110 had entries in its translation table 115 which allowed it to "un-translate" the packets and send them to the appropriate hosts. If, however, a new connection was initiated from an external host and destined to the shared IP address, the router 110 will have no way of knowing which internal host was the intended target of the packet.

If the router 110 does not know what to deliver the packet to, it will drop the packet. As such, a dynamic NAPT only works if the internal host sends the first packet. If the external host sends the first packet, it will be dropped when it reaches the translation device. Therefore, traffic will flow through a dynamic NAPT only if the internal host initiates the connection. (This is in contrast to static NAT and static NAPT, which are both bi-directional.) The problem with static NAPT, in which a static binding is created between private (IP address, port number) and public (IP address, port number), is that resources are wasted because a binding is retained even if there is no traffic. Consequently, static NAPT is not a scalable solution in the context of high-scale subscriber services such as broadband edge and mobile edge.

§ 1.2.1.4 Challenges Related to NAPT

It is desired for NAPT to perform address and port translation on a subscriber's forwarding plane; that is, without sending traffic to the control plane and without steering the traffic to another device. In existing solutions, all the traffic is forwarded to either a separate service box or line card to perform NAPT. This requires an extra device, extra rack space, extra power consumption, etc. Thus, one challenge is how to minimize power and rack space requirements for the NAPT service. It would be useful to perform the NAPT functionality truly inline (at line speed or close to line speed), without requiring any other device.

Further, in cases in which the flow is spread over multiple nodes (such as, for example, on an aggregate bundle), there are some additional challenges. First, traffic can arrive on any link of the bundle. Upon failure, the traffic should switch over to another link without requiring any NAPT rebinding, and without packet loss. Thus, another challenge is to avoid packet loss in event of link failure. Since traffic flow can also be asymmetric (where for the same flow ingress traffic arrives on one link and egress traffic goes out on another link), yet another challenge is how to create same unique binding on all the member node(s). Finally, if there is no traffic flowing on any of the links for a given period of time, then the corresponding NAPT binding(s) should be freed. Thus, yet another challenge is how to manage NAPT binding age-out so that a binding is deleted only when none of member nodes receive the traffic for a given period.

§ 2. SUMMARY OF THE INVENTION

One or more of the challenges discussed above is solved by providing, for use in a router servicing traffic from member links belonging to an aggregated bundle of links, one of which links is an anchor and each of at least one of remaining links is a non-anchor, a machine-implemented method for providing Network Address and Port Translation (NAPT), method comprising: (a) receiving, by the anchor, an outbound packet having a source IP address; (b) responsive to receiving the packet, determining, by the anchor, whether or not a translation table of the anchor has a binding entry associated with the source IP address of the packet; and (c) responsive to determining that the translation table of the anchor has a binding entry associated with the source IP address of the packet, (1) translating, by the anchor, the source IP address and a source port number of the packet to a public source IP address and a new source port number from the binding entry, to generate an updated packet, (2) forwarding, by the anchor, the updated packet towards its destination, and (3) resetting an "age out" timer associated with the binding entry, and otherwise, responsive to determining that the translation table of the anchor does not have a binding entry associated with the source IP address of the packet, (1) allocating, by the anchor, a port number and a public source IP address to the source IP address of the packet, (2) storing in the translation table of the anchor, a new binding entry associating the source IP address of the packet with the allocated port number and public source IP address, (3) starting an "age out" timer associated with the new binding entry, (4) communicating the new binding entry to each of the at least one non-anchor, (5) translating, by the anchor, the source IP address and a source port number of the packet to the public source IP address and the port number from the new binding entry, to generate an updated packet, (6) forwarding, by the anchor, the updated packet towards its destination, and (7) resetting the "age out" timer associated with the new binding entry.

If it is determined that the "age out" timer of the binding entry has expired, at least some implementations of the example method further (1) remove the binding entry from the translation table of the anchor, and (2) communicate to each of the at least one non-anchor that its local instance of the binding entry should be removed from its local translation table.

If the anchor receives (from any one of the at least one non-anchors) a refresh message associated with the binding entry, at least some implementations of the example method reset the "age out" timer associated with the binding entry.

At least some implementations of the example method further include (d) receiving, by the anchor, an inbound packet; (e) responsive to receiving the inbound packet, determining, by the anchor, whether or not a translation table of the anchor has a binding entry associated with the destination IP address of the inbound packet; and (f) responsive to determining that the translation table of the anchor has a binding entry associated with the destination IP address of the inbound packet, (1) translating, by the anchor, the destination IP address and destination port number of the inbound packet to a private destination IP address and a new port number from the binding entry, to generate an updated packet, (2) forwarding, by the anchor, the updated packet towards its destination, and (3) resetting an "age out" timer associated with the binding entry, and otherwise, responsive to determining that the translation table of the anchor does not have a binding entry associated with the destination IP address of the packet, dropping the inbound packet.

If the anchor receives a packet fragment, at least some implementations of the example method reassembles, by the anchor, the packet fragment.

One or more of the challenges discussed above is solved by providing, for use in a router servicing traffic from member links belonging to an aggregated bundle of links, one of which links is an anchor and each of at least one of remaining links is a non-anchor, a machine-implemented method for providing Network Address and Port Translation (NAPT), method comprising: (a) receiving, by a non-anchor, an outbound packet having a source IP address; (b) responsive to receiving the packet, determining, by the non-anchor, whether or not a translation table of the non-anchor has a binding entry associated with the source IP address of the packet; and (c) responsive to determining that the translation table of the non-anchor has a binding entry associated with the source IP address of the packet, (1) translating, by the non-anchor, the source IP address and a source port number to a public source IP address and a new source port number from the binding entry, to generate an updated packet, (2) forwarding, by the non-anchor, the updated packet towards its destination, and (3) setting a "refresh timer" flag associated with the binding entry, and otherwise, responsive to determining that the translation table of the non-anchor does not have a binding entry associated with the source IP address of the packet, forwarding the packet to the anchor.

At least some implementations of the example method further include (d) receiving, by the non-anchor, a binding entry from the anchor, and (e) responsive to receiving the binding entry from the anchor, (1) adding, by the non-anchor, the binding entry received to its translation table, and (2) starting, by the non-anchor, a refresh timer associated with the binding entry. At least some such implementations of the example method further include: (f) determining that the refresh timer associated with the binding entry has expired, wherein the refresh timer is shorter than an anchor "age out" timer associated with the binding entry; and (g) responsive to determining that the refresh timer associated with the binding entry has expired, (1) determining whether or not the "refresh timer" flag associated with the binding entry has been set, and (2) responsive to determining that the "refresh timer" flag associated with the binding entry has been set, (A) notifying, by the non-anchor, the anchor that the "refresh timer" flag associated with the binding entry has been set, (B) resetting the that the "refresh timer" flag associated with the binding entry, and (C) restarting the refresh timer flag associated with the binding entry, and otherwise, responsive to determining that the "refresh timer" flag associated with the binding entry has not been set, restarting the "refresh timer" associated with the ending entry.

At least some implementations of the example method further include: (d) receiving by the non-anchor, from the anchor, an age out message associated with the binding entry; and (e) responsive to receiving from the anchor, the age out message associated with the binding entry, removing, the binding entry associated with the age out message from the translation table of the non-anchor. At least some such implementations of the example method further include (f) removing the refresh timer associated with the binding entry associated with the age out message.

At least some implementations of the example method further include: (d) receiving, by the non-anchor, an inbound packet; (e) responsive to receiving the inbound packet, determining, by the non-anchor, whether or not a translation table of the non-anchor has a binding entry associated with the destination IP address of the inbound packet; and (f) responsive to determining that the translation table of the non-anchor has a binding entry associated with the destination IP address of the inbound packet, (1) translating, by the non-anchor, the destination IP address and destination port number of the inbound packet to a private destination IP address and a new port number from the binding entry, to generate an updated packet, (2) forwarding, by the non-anchor, the updated packet towards its destination, and (3) setting a refresh flag, and otherwise, responsive to determining that the translation table of the non-anchor does not have a binding entry associated with the destination IP address of the inbound packet, dropping the packet.

If the non-anchor receives a packet fragment, at least some implementations of the example method further include sending, by the non-anchor, the packet fragment to the anchor.

An example router is configured to service traffic from member links belonging to an aggregated bundle of links, using any of the foregoing methods. As one example, the example router may be a single chassis router. If so, the aggregated bundle of links may belong to a link aggregation group (LAG). Another example router is distributed across multiple chassis. If so, the aggregated bundle of links may belong to a multi-chassis link aggregation group (MC-LAG).

§ 3. BRIEF DESCRIPTION OF THE DRAWINGS

§ 4. DETAILED DESCRIPTION

Figure 1:
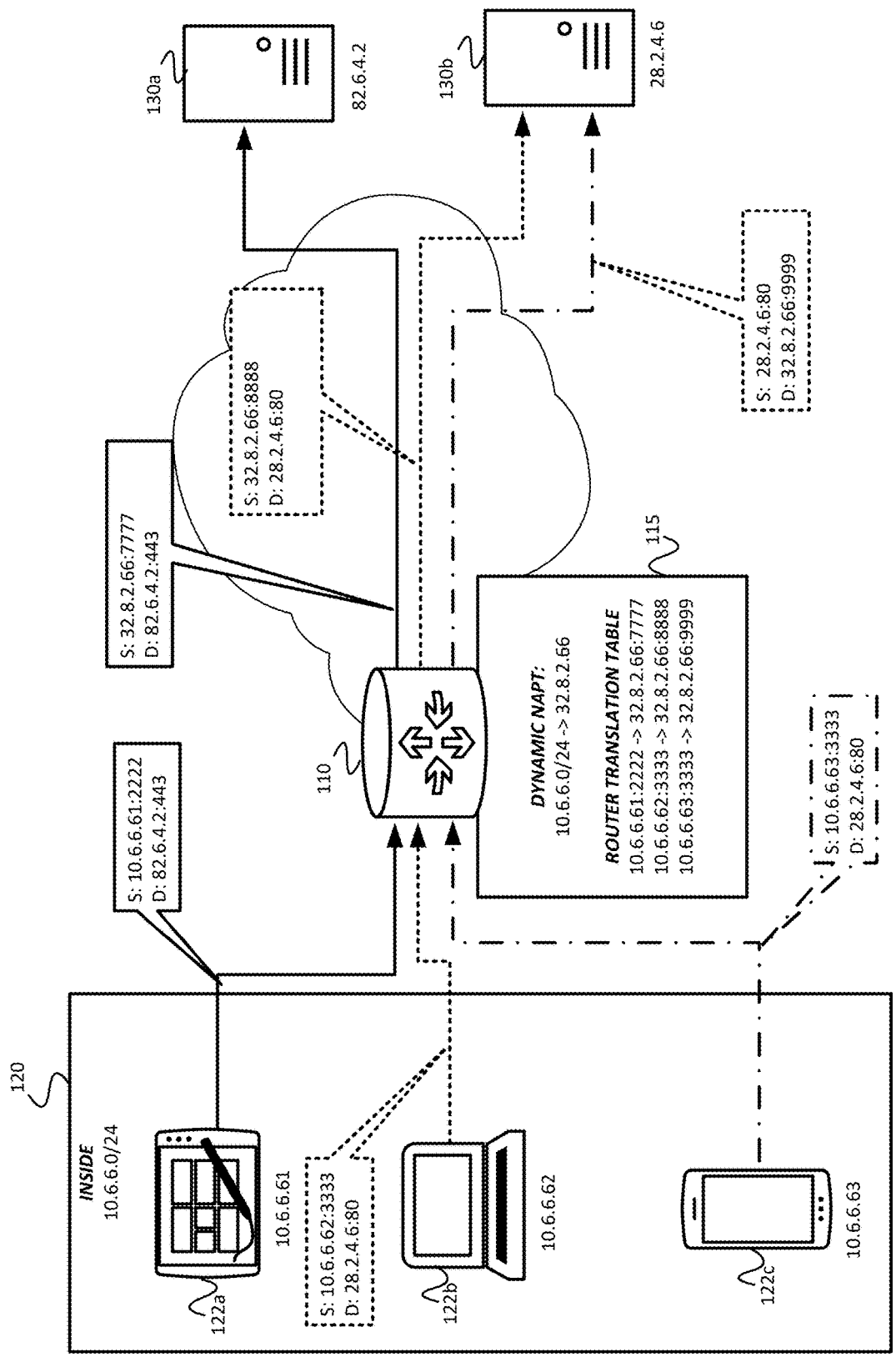
FIG. 1 depicts an example illustrating the processing of outgoing or outbound (uplink) traffic.
Figure 2:
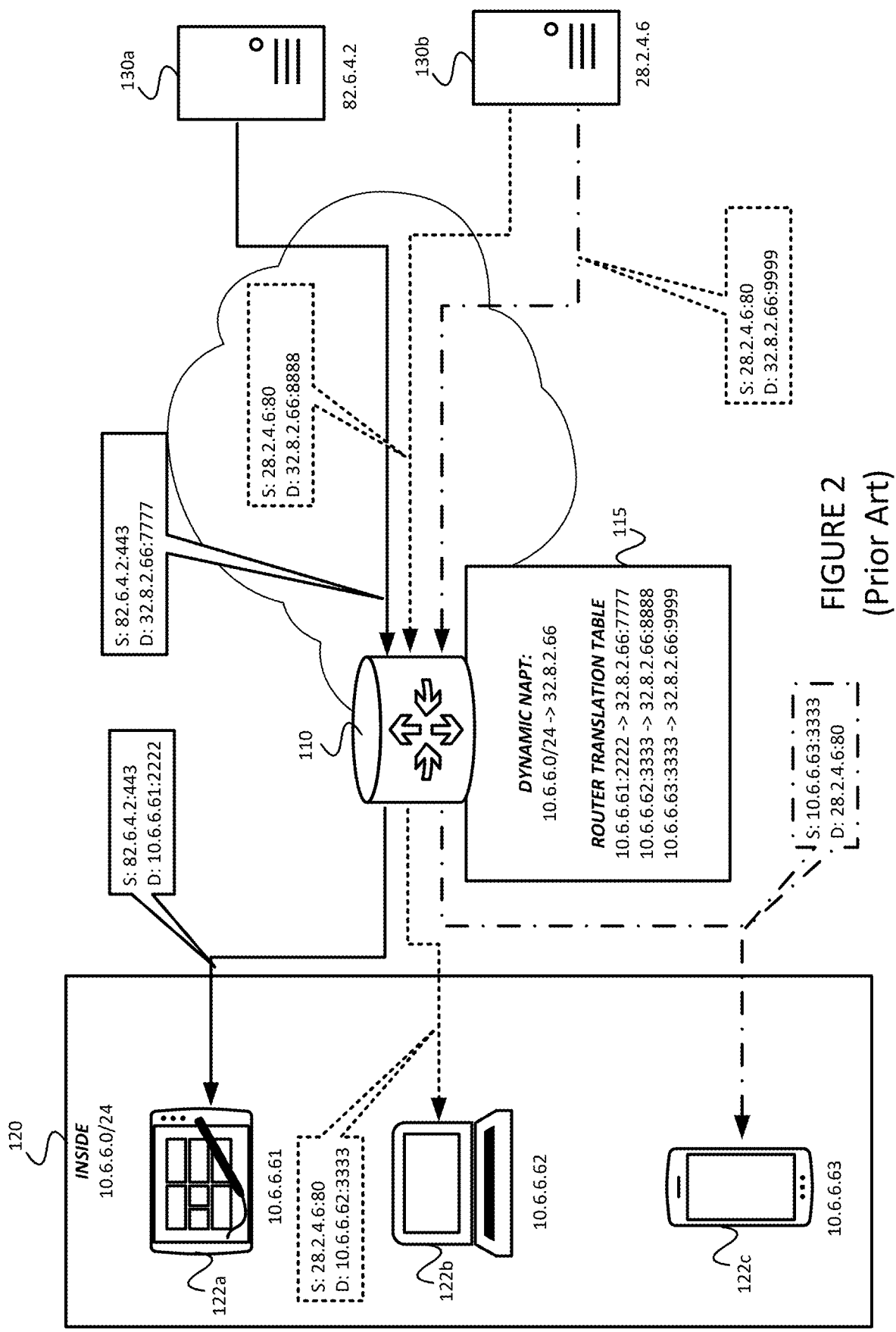
FIG. 2 depicts an example illustrating the processing of incoming or inbound (downlink) traffic.

The present disclosure may involve novel methods, apparatus, message formats, and/or data structures to provide (e.g., dynamic) NAPT services, preferably inline, and to facilitate NAPT services in the context of bundled (e.g., aggregated) links. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 Definitions and Acronyms

Age-Out may refer to managing a NAPT binding so that it is deleted if it is not used (e.g., not used by any member nodes) for a given period.

Anchor: In the context of Network Address and Port Translation (NAPT), an "anchor" refers to a specific type of binding established by the NAPT device to support certain types of network traffic or protocols that require special handling. For example, some network protocols or applications use multiple connections or dynamically negotiated ports for their communication. These protocols may not work correctly with standard NAPT because the NAPT device might translate port numbers in a way that disrupts the protocol's functionality. To accommodate such protocols or applications, the NAPT device establishes an "anchor" binding. An anchor binding may reserve a specific external port number for a particular internal device or application. When traffic associated with that application or device traverses the NAPT device, it ensures that the same external port number is consistently used for all connections related to that application or device. By using an anchor binding, the NAPT device maintains consistency in the translation of port numbers for the specified application or device. This ensures that the protocol or application can function properly despite the translation performed by the NAPT device. Anchor bindings may be manually configured by network administrators on the NAPT device to support specific applications or protocols that require special handling. Alternatively, some NAPT devices may have built-in support for automatically detecting and handling certain types of traffic that require anchor bindings.

Binding (or Binding Entry): In the context of Network Address and Port Translation (NAPT), a "binding" or "binding entry" refers to the association or mapping in a "binding table" or "translation table" between from an internal private IP address and port number to an external public IP address and port number, and vice-versa. These bindings are maintained by the NAPT device (typically a router or firewall) and are used to translate outgoing and incoming network traffic.

Carrier-Grade Network Address Translation (CG NAT) is a type of NAT (Network Address Translation) technique used by Internet Service Providers (ISPs) to manage the limited availability of public IPv4 addresses. It's an extension of traditional NAT, but it's implemented at a larger scale by ISPs to accommodate the growing number of internet-connected devices.

Dynamic NAPT: Network address and port translation in which bindings are not static, but rather, can be reused/reassigned.

In the realm of networking, particularly in the context of devices from Juniper Networks, Inc. of Sunnyvale, CA (Juniper) such as routers and switches, the terms "fast path" and "slow path" refer to two different processing mechanisms for handling packets. In Juniper's terminology, the fast path and slow path represent the distinct processing paths for packets within their networking devices. The fast path ensures rapid forwarding of packets using hardware acceleration and preconfigured rules, while the slow path involves CPU-based processing for more advanced operations that cannot be handled in hardware. This separation enables efficient packet handling, balancing performance and flexibility in networking environments.

Fast Path: The fast path is the high-speed processing route that packets take when they can be quickly forwarded without needing extensive processing by the device's CPU. In the fast path, packets are forwarded (often at line speed or wire speed) based on preconfigured rules or in hardware without involving the main CPU. This path is optimized for efficiency and is used for forwarding traffic at wire speed, ensuring minimal latency and maximum throughput. Common operations that are typically handled in the fast path include simple packet forwarding, forwarding based on cached information (like Layer 2 MAC or Layer 3 IP address tables), as well as Multiprotocol Label Switching (MPLS) label lookup and switching, Segment Routing (SR or SPRING) label lookup, and routing using cached route lookups. In Juniper devices, the fast path is typically referred to as the "data plane" or "forwarding plane." Fast path processing occurs within the hardware of the device, leveraging specialized forwarding ASICs (Application Specific Integrated Circuits) or network processors.

Slow Path: The slow path is the processing route that packets take when they require more complex handling by the device's CPU. In the slow path, packets are processed by the device's operating system or control plane software, which involves more intensive operations such as deep packet inspection, policy enforcement, quality of service (QOS) classification, access control lists (ACLs) processing, traditional/conventional network address translation (NAT), and/or routing decisions that are not readily available in hardware. Operations in the slow path may involve complex calculations or interactions with the device's routing protocols (e.g., OSPF, BGP) or other control plane processes. This path is slower compared to the fast path and can introduce higher latency because it involves CPU processing. The slow path in Juniper devices is often referred to as the "control plane." Although the slow path offers flexibility for handling various network scenarios, it can introduce higher latency compared to the fast path due to CPU involvement.

"LAG" means Link Aggregation Group.

"Match" in the context of NAPT means that there is a binding entry corresponding to the private source IP address of an outbound (uplink) packet, or that there is a binding entry corresponding the public destination IP address (and port) of an inbound (downlink) packet.

"MC-LAG" means Multi-Chassis Link Aggregation Group.

A "network device" includes, but is not limited to, a layer-2 switch, a layer-3 router, or a Transparent Interconnection of Lots of Links (TRILL) routing bridge (RBridge).

"Packet" refers to a group of bits that can be transported together across a network. "Packet" should not be interpreted as limiting embodiments of the present invention to any networking layer. "Packet" can be replaced by other terminologies referring to a group of bits, such as "message," "frame," "cell," or "datagram." Packet may be a group of bits formed per the Internet Protocol (e.g., IPv4, IPv6, etc.).

§ 4.2 Example Apparatus

Figure 3:
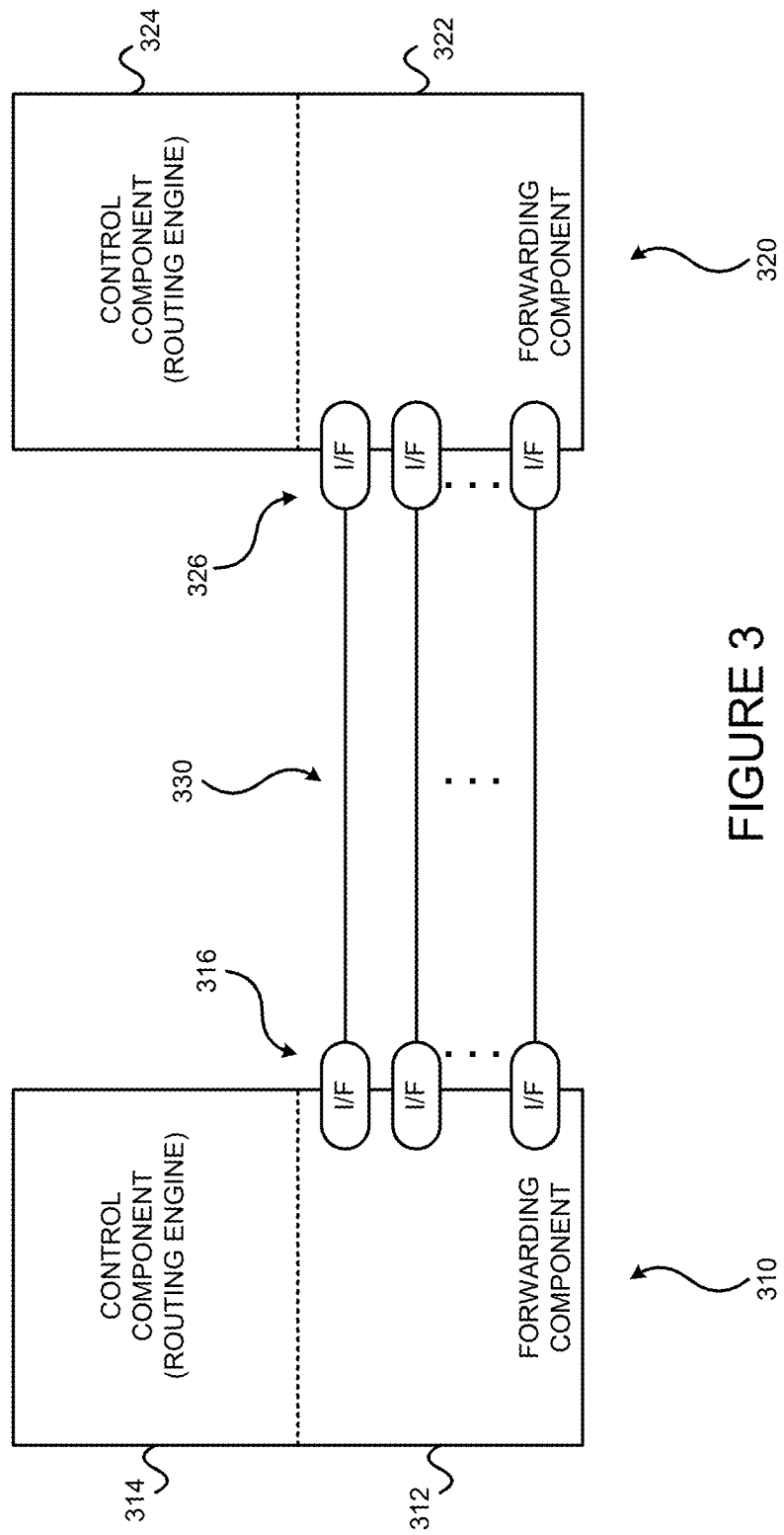
FIG. 3 illustrates two data forwarding systems, which may be used as nodes, coupled via communications links, in a communications network, such as communications network performing NAPT.

The data communications network nodes may be forwarding devices, such as routers for example. FIG. 3 illustrates two data forwarding systems 310 and 320 coupled via communications links 330. The links may be physical links or "wireless" links. The data forwarding systems 310,320 may be routers for example. If the data forwarding systems 310,320 are example routers, each may include a control component (e.g., a routing engine) 314,324 and a forwarding component 312,322. Each data forwarding system 310,320 includes one or more interfaces 316,326 that terminate one or more communications links 330.

The control component (also referred to as "the control plane") 314,324 functions to discover the network's topology and compute loop-free, optimal routes. It is where routing protocols, such as Open Shortest Path First (OSPF), Intermediate System-Intermediate System (ISIS) and Border Gateway Protocol (BGP), and signaling protocols, such as Resource reSer Vation Protocol (RSVP) and Label Distribution Protocol (LDP), run and where the routing tables (also referred to as Routing Information Bases (RIBs)), including multicast reverse path checking tables and Virtual Routing and Forwarding (VRF) tables, are instantiated and populated. The control plane includes the kernel and daemons. The control plane may also provide an interface for configuring and monitoring the router.

The control plane, usually implemented on a Routing Engine (RE), which is also known as a Supervisory Engine, a Route Processor, among other names, is based on an operating system, called a Network Operating System (NOS) (such as Junos from Juniper Networks, Inc. of Sunnyvale, CA), running on a general purpose processor because the computational and memory resources it requires are complex, so a software implementation is preferred. The control plane is the router's brain and its computational element.

The forwarding component (also referred to as "the forwarding plane") 312,324 functions to transfer packets from an ingress interface (port) to an egress interface (port) so as to move each packet a hop closer to its ultimate destination. By traversing a chain of forwarding plane instances, each contained within a router, a packet completes its trip from source to destination. Unlike the control plane, which only looks at control (such as OSPF Link State Updates and RSVP-TE PATH and RESV messages) and management packets (such as SNMP messages), each and every packet arriving at the router is processed by the forwarding plane.

A proper understanding of the networking dynamics calls for establishing a clear distinction between what is relevant to routing time (also called convergence time) versus what is relevant to forwarding time. To begin with, mapping the topology and computing loop-free paths is the duty or the routers control plane. The forwarding plane gets the routes from the control plane and has to trust them. (Lacking the global topological view, the forwarding plane has no way to decide on whether or not they are loop-free or optimal.) On the other hand, when (equal cost) multiple paths (next hops) exist (i.e., when Equal Cost Multi Path or ECMP is present), even though the routing plane identifies them and pushes them to the forwarding plane, the routing plane doesn't decide on the specific next hop taken by each particular flow of packets. This load balancing decision is taken at forwarding time by the forwarding plane. When an action needs to be taken near instantly (e.g., at line speed), it is to be taken at the forwarding plane. Local protection mechanisms depend on installing backup paths in the forwarding plane so that they may be immediately enacted without waiting for the lengthy traditional Interior Gateway Protocol (IGP) convergence that takes place in the control plane.

The control plane's main function, in addition to providing an interface to manage the router, is to program the forwarding plane with the information required to do its job in the form of a table mapping network destinations to egress interfaces. This table is known as the Forwarding Information Base (FIB), or the forwarding table.

Although the control plane and the forwarding plane used to share resources, today they are typically separated. The separation ensures that the forwarding of packets is not impacted by surges of control activity in the control plane and to even continue during brief periods of control plane instability or unavailability. With the Software Defined Network (SDN) approach to networking, the control plane doesn't have to be bundled with the forwarding plane in a single box. Rather, the control plane be provided remotely and command the forwarding plane over the network. In such a context, the control plane element is called a "controller" and may centrally preside over a number of forwarding machines in the network, using a variety of new "SDN" protocols (such as OpenFlow or Path Computing Element Protocol (PCEP)). With such an arrangement, the controller can provide network operators and administrators with an abstract holistic view of the network and enable its programming via an interface called a Northbound Interface. The controller could leverage its global, complete view of the network to provide optimization and agile provisioning. The SDN evolution facilitates control plane programmability.

The forwarding component 312,322 may be, or many include, a Packet Forwarding Engine (PFE). Functions, basic workings, components and features of an example PFE are discussed with reference to FIG. 4.

A router can be thought of as a packet switching device. It is a node in a communications network topology that makes a data network. A router receives a packet on an inbound interface (the ingress interface), looks at the destination address in the packet's header, and determines, based on that, the outgoing interface (the egress interface). The actual packet movement from an ingress (input) interface to an egress (output) interface is commonly referred to as "forwarding". Therefore, a router, thus, may also be called a "forwarder".

Figure 4:
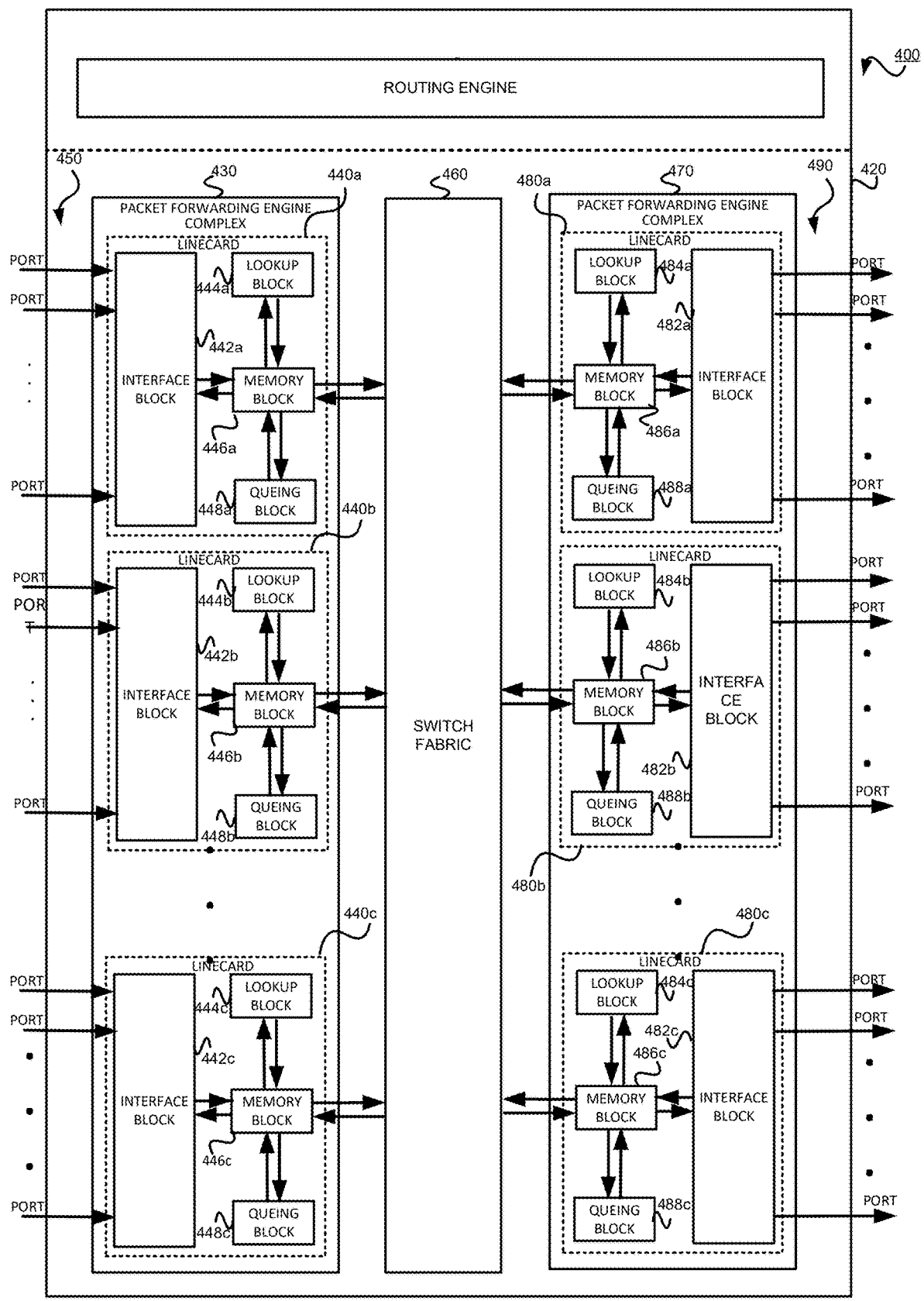
FIG. 4 is a block diagram of an example router on which one or more example methods consistent with the present description may be implemented.

Referring to FIG. 4, in addition to a chassis and power supplies, a router 400 typically includes a Routing Engine (RE) 410, a set of linecards 440/480, and switch fabric 460. The RE 410 embodies the control plane. The set of linecards 440/480 interconnected by the switch fabric 460, together represent the forwarding plane (also called the data plane). Each linecard 440/480 hosts the network ports (router interfaces) 450/490 that send and receive traffic (e.g., packets), to and from links, and one or more ASIC (Application Specific Integrated Circuit) chips or chipsets (chip complexes), each called a Packet Forwarding Engine (PFE) 430/470. The forwarding intelligence, the ability to parse and understand packet headers, lies in the PFE 430/470.

The PFE 430/470 is the centerpiece of the forwarding plane. It is implemented typically as an ASIC chip or a chipset residing on a linecard 440/480. Although the PFE 430/470 could also be implemented as a piece of code as in virtualized platforms, the following discussion focuses on hardware PFEs 430/470. The PFE 430/470 is the component that "understands" packets (can decode their headers). In essence, the PFE 430/470 is a header processing and forwarding lookup engine. The PFE 430/470 houses the FIB (forwarding table) mentioned earlier and uses it, upon inspecting the packet's header, to determine to which egress port the packet is to be sent. Each entry in the FIB is a masked prefix (a network address coupled with a string of bits that indicate which bits of the address are the network part).

Even though multiple entries can match the destination address in a packet, the most specific match is chosen. Seeking the best matching entry (the longest, the most specific) in the FIB is called a "route lookup" (even though it is actually a forwarding lookup). The process of seeking the most specific match is known as the Longest Prefix Match (LPM). In case of ECMP, as highlighted earlier, the PFE 430/470 will select one of the outgoing interfaces).

When the PFE 430/470 receives a packet, it places the packet in a temporary memory block called a "buffer", inspects its destination address, looks for an LPM match for the destination in the FIB (forwarding table) and determines accordingly the next hop and the outgoing interface. It then does some processing to the packet's header and sends it on its way. Referring to FIG. 4, the side that connects the PFE 430/470 to the network ports, is called its "WAN Side", while the side that connects the PFE 430/470 to the fabric is called its "Fabric Side". (This description is simplified, as the packet actually arrives encapsulated in a frame (an Ethernet frame most commonly) with layer 2 headers and trailers. Upon entering the PFE 430/470, these are error-checked and stripped away before the packet is processed. Before leaving the router, a layer 2 header and a trailer are also added to the packet.)

From the description above, it is clear that the PFE 430/470 contains a buffer memory to hold packets, a memory element for holding the FIB and a lookup module 444 that maps the destination address of the packet to a next hop or a bunch of next hops in the case of load balancing over equal cost multipath (ECMP). Functional blocks of the PFE 430/470 are described below.

A main component of the PFE 430/470 is the routing Lookup Block 444, known also as the Route Block, L Block, R Block, LU Block, etc. The Lookup Block 444 hosts the FIB (the real FIB, that actually forwards packets). The FIB constructed in the RE 410 is a copy that is in the router's brain. It gets downloaded to the PFE 430/470 to be actionable. The FIB is a table in that it hosts a list of data. In implementation, it is usually a tree-like structure, called a "trie" (coming from the word retrieval and pronounced tree) stored in a fast Dynamic RAM variant (such as Reduced Latency RAM or RLDRAM). (Employing a trie on RLDRAM is not the highest performance option but the most scalable one given the huge routing tables of our times (hundreds of thousands of entries or even a couple of millions). Ternary Content Addressable Memory (TCAM) is much faster in doing LPM but is complex, has a high power consumption and takes up a large area on the chip.)

The Lookup Block 444 is also used to identify the logical interface (called an ifl or a unit by Junos and a sub-interface by other Network Operating Systems) the packet arrived on. (Note that modern routers pretend that each packet arrives not on the physical interface but on a virtual interface contained within it.) The determination of an ifl is usually based on a demultiplexing field within the packet, such as a VLAN ID. Each of these ifls is treated as a full-fledged interface in that it gets an IP address and is associated with services such as firewall filters (access lists or ACLs), policers and classifiers.

The Memory Block 446 of the PFE 430/470 is a buffer that hosts packets arriving to the PFE from the WAN Side. It is usually the PFE block to which all other blocks are connected. Commonly, it is implemented using a fast memory type called Static RAM (SRAM). It is called the Buffer Block, Memory block, B Block, M Block, XM Block or MQ (as it can do some basic, port level queueing) or other names alluding to its function. The Memory Block 446 queues packets and manages their dequeuing into the fabric or out to the network ports. It extracts the packet's header and feeds it to the Lookup Block 444 to determine where the packet should be sent.

Another function usually done by the Buffer (Memory) Block is "cellification". Switching hardware can be better optimized when the data units are of fixed size. Therefore, packets, which are of variable length, are typically divided into short, fixed-sized pieces called cells (or J-Cells in a Juniper Networks router). This cellification is conducted by the PFE 430/470 (typically by the Memory Block) before the route lookup is performed and before the packet is sent over the fabric (or towards other WAN interfaces in same PFE 430/470).

The first J-Cell (the one that contains the header and determines the packet's forwarding destiny) is called a Notification Cell (NC). The remaining J-Cells are called Data Cells (DCs). This cellification happens as soon as the packet is received and initial layer 2 processing is completed. Only the Notification Cell is read into the Lookup (Route) Block 444 (the Notification Cell is sometimes called the packet's HEAD). The Data Cells (constituting the packet's TAIL) wait in a buffer for the Notification Cell to be processed and the next hop to be determined. After that, the Data Cells stream through the PFE 430/470 or through the PFE 430/470 and fabric 460 to the outbound interface (undergoing a second lookup, if that interface is on a different PFE). The cells are reassembled into a packet before they leave the egress PFE 430/470.

In some designs, interfaces are not connected directly to the Buffer Block but are connected to an Interface Block (called I Block, XI Block, etc.) 442 that sits between interfaces and the Memory Block (see the diagram) 446. In such cases, functions usually performed by the Buffer Block such as queueing (and handling oversubscription) are delegated to the Interface Block 442. In some PFE designs, there is a Fabric Block (called F Block, XF Block, or a variation thereof) that serves as an mediator between the Memory Block 446 and the Fabric 460.

Basic Queueing, which determines the order of servicing packets and the priority and resources (such as bandwidth and buffer space) allocated to each packet, is handled by the Memory Block 446, as mentioned above (and for that it is sometimes called MQ). Some applications require more granular queueing to deal with multiple subscribers served by a single port. In such applications, queueing calls for an additional block called the Queueing Block 448, which provides multi-level hierarchical Class of Service and queueing.

To reiterate, the forwarding lookup is an important function of the PFE 430/470. This is complemented by some layer 2 processing, which usually involves associating the packet with an ifl (a logical interface, a unit or a sub-interface). The lookup includes a Media Access Control (MAC) address lookup, which identifies the MAC address of the next hop. Sometimes it includes a label lookup as well (for MPLS traffic).

To enable more flexibility and granularity in traffic engineering, forwarding is not confined to destination-based forwarding. The forwarding of a packet by the PFE 430/470 can consider other packet fields such as the source address, the value of the TOS (Type of Service) Byte and the UDP and TCP port numbers. Forwarding based on such fields may be referred to as Filter-based Forwarding (FBF), Policy-based Routing (PBR), etc. With FBF, the FIB will contain a mapping between, not only destination addresses, but also other packet fields (called Keys) and next hops.

In addition to the inclusion of more packet fields in the forwarding decision process, labels were introduced into the packet switching world by the advent of MPLS (Multi-Protocol Label Switching). With the advent of MPLS, the FIB became a place for storing label forwarding entries as well as prefixes. When a labeled packet arrives at PFE 430/470, its upper (outermost) label is inspected and a matching entry is sought in the FIB using a hash table. The matching entry will indicate the next hop. The next hop will specify the outbound interface, the MAC address of the interface of the next router along the path in addition to a label operation and a label value if the operation is a swap or push. In most transit routers, this operation is a swap operation, but could also be a pop, a push or a combination of operations, depending on the router's location within the topology and the services (such as local protection or fast reroute) it is offering.

In addition to Policy-based routing and MPLS, new forwarding functions, called forwarding services (or simply services), may be incorporated into the PFE 430/470 to achieve various performance, security and monitoring objectives. With the introduction of services demand from the PFE 430/470 became more than the relatively simple lookup and forward sequence. Services are additional functions, which are mostly handled by the Lookup Block 444, that either manipulate the packet's header, the entire packet or determine whether the packet is to be forwarded or not, how fast the packet is to be forwarded and how much resources are allocated to servicing the packet such as bandwidth and buffer space. Some services, such as multicast and sampling don't change packets. Some services, such as NAPT, manipulate addressing and port fields located in the header. Some services such as IPSec encryption, radically change packets and their headers. Services required to offer Class of Service (CoS) include classification, policing, filtering, scheduling (forwarding prioritization and bandwidth allocation), shaping and marking (coloring).

Encapsulation and decapsulation, needed for tunneling (such as GRE tunneling, IPSec encapsulation or the multicast-in-unicast tunneling required as part of Protocol Independent Mulicast-Sparse Mode (PIM-SM) operation) are also additional services that may be required from the PFE 430/470. In the past, many of these services, such as NAPT, tunneling, sampling and flow export (jflow), necessitated the use of special linecard or module. Today, the lookup block 444 of the PFE 430/470 is capable of doing most of these services (service are called "inline", when done by the Lookup Block in the PFE rather than a dedicated hardware module).

To summarize, a PFE 430/470 performs route, flow, MAC and label lookups, in addition to classification, scheduling (queueing and dequeuing), policing, filtering, accounting, sampling, mirroring, unicast and multicast reverse path checking, class-based routing, packet header re-writes, coloring (marking), encryption, decryption, encapsulation, decapsulation and more (recently, the latest PFEs 430/470 can do telemetry and even participate in the generation of packets for bi-directional forwarding detection (BFD), a lightweight liveness protocol for rapid link failure detection).

The following describes a packet (a data packet, not a control packet) in its journey through the example router. A packet is received on an ingress physical interface (built on or pluggable module). This is typically associated with the conversion from optical signaling to electrical. The received packet is then transferred to the PFE 430/470 through the PFE's WAN side. Next, the packet is stored in a Memory Block (buffer) 4466 in the PFE 430/470. Layer 2 (Link Layer) frame encapsulation is processed. (This involves error checking, identifying the encapsulated protocol (whether the packet is IPv4, IPV6 or MPLS) and stripping out the layer 2 headers.) The packet is typically chunked into cells. The packet's header (sometimes called HEAD) is sent to the Lookup Block 444 (typically in the form of a Notification Cell), where the destination address in the packet is mapped to an egress interface by looking up the address (or the label, if MPLS is used) in the forwarding table. The Lookup Block 444 may also determine the destination MAC address it should have upon leaving the router 400. The Lookup Block 444 may also be responsible for identifying the logical interface (ifl) the packet belongs to and applying any of the services discussed above, such as network address translation, policing and the like. (Note that an ifl is a virtual construct with no physical manifestations. Identifying a packet as belonging to an ifl means that this packet will be processed according to the parameters associated with that ifl (such as multi-field classification or filtering). In a way, the ifl is a packet processing profile. For the outside world, only physical interfaces (ifd's) are real. Determining the ifl the packet belongs to is based on some demultiplexing field, typically the VLAN ID.)

The lookup may result in multiple valid next hops (Equal Cost Multi Path or ECMP interfaces). In such a case, a single egress interface is selected based on a hashing value computed from the fields in the packet (called hashing keys), ingress Interface and other parameters. Using a hash ensures that packets belonging to the same flow follow the same path and thus avoid being reordered. The value in the packet's Time To Live (TTL) is decremented and the checksum field is recomputed (if the packet is an IPV6 packet, then the Hop Count is decremented and there is no checksum field).

Note that the egress interface determined by the lookup could be in the same PFE 430/470, same linecard 440/480 but on a different PFE 430/470, or in different linecards 440/480 altogether. If the egress interfaces is on the same PFE 430/470, then it is sent to it directly where it gets encapsulated in a layer 2 frame and punted into the link. If the egress interfaces is on another line card, then the packet is transmitted on the fabric 460 to that other linecard 440/480 where another lookup takes place.

The foregoing description assumes that a route exists for the packet, that the frame is not corrupted, the TTL is larger than 1 and that no services other than unicast forwarding are required (no multicast, no sampling, no classification, no rate limiting, no filtering and no address translation). It also assumes no Ethernet frame.

Today, a PFE 430/470 is a specialized piece of siliconware implemented as an Application Specific Integrated circuit (ASIC), a set of ASICs or based on a specialized type of processor called an NPU (Network Processor Unit). An NPU can be thought of as a programmable PFE 430/470 that has some fundamental forwarding primitives burned-in (built-in), while at the same time being programmable via what is known as microcode. Generally speaking, the more hardwired the design is, the higher the performance is but the less the flexibility in adding features is.

A linecard 440/480 is engineered to host one or more PFE complexes that are typically fixed on the linecard. Interfaces (ports) 450/490 hosted on the linecard may be built-in or modular. Juniper Networks calls a card that carries interfaces, a Physical Interface Card (PIC). A linecard is called a PIC Concentrator (PC). Linecards for some early platforms were called Flexible PIC Concentrators (FPC), Dense PIC Concentrators (DPCs), MPC (Modular PIC Card), etc. In some example routers, a linecard hosts one, two or a handful of PFE complexes. Utilizing multiple PFEs in a linecard is a way of reusing an existing PFE to scale the capacity of the PFE.

The word "PFE" is sometimes used to refer to the chipset, sometimes to all PFE complexes on a certain linecard and sometimes (very loosely) to the entire forwarding plane, which typically includes more than a PFE (two for unicast, more for multicast) in addition to the fabric.

§ 4.3 Example Method(s)

This section describes example methods for providing NAPT services, preferably inline (on the "fast path"), and to facilitate NAPT services in the context of bundled (e.g., aggregated) links. The following example methods use an anchor model, in which one of the member links of the group or bundle is selected as anchor.

When uplink traffic arrives on the any of the member links of the bundle, the link's forwarding path looks to the NAPT binding entry in its forwarding path. If a binding entry is found, the example method (1) translates the address and port in truly inline manner (without requiring any other device) in accordance with the matching binding entry, and (2) forwards the traffic. If, on the other hand, a binding entry is not found, the received traffic is forwarded to the anchor (e.g., previously assigned to the set or bundle of links).

The anchor allocates the port and creates a NAPT binding on all the member links of the group or bundle of links. This ensures that the forwarding path of all of the member links have the same NAPT binding, and have same view of allocated ports. Subsequent traffic is translated inline on the corresponding member link itself (since it will have the NAPT binding entry assigned by the anchor). Since all of the member links have same view of NAPT binding in their forwarding path (that is, have consistent NAPT binding entries), in case of link failure, traffic seamlessly switches from one link to another without any traffic loss (because NAPT rebinding isn't needed).

Downlink traffic performs lookup for reverse NAPT binding entry in the link's forwarding path. If a matching entry is found, the forwarding path of the link (1) translates address and port in accordance with the binding entry, and (2) forwards the traffic. If, on the other hand, there is no matching binding entry, the downlink traffic is dropped.

Note that fragmented traffic (e.g., as identified by an IP header bit) is always forwarded to anchor to ensure integrity of the packet.

If there is no traffic (that is, if there is neither uplink nor downlink traffic) for a flow on any of the member links for a determined (e.g., preconfigured) period of time, then corresponding entry "ages out" and this "aged out" binding entry is removed from NAPT table of all the member links. Age out may be done in context of a timer thread and only the anchor triggers the age-out. This permits all the binding entries on the member links to remain in sync. There are two-time intervals: (1) AgeOut; and (2) Refresh. The refresh interval is less than (e.g., one third of) the AgeOut interval. If a non-anchor receives traffic from any direction (e.g., uplink or downlink) for a flow within a refresh period, it sends a refresh message at the expiration of a refresh interval, corresponding to NAPT binding, to the anchor. In response, the anchor restarts the AgeOut timer. If anchor doesn't receive traffic from any direction (e.g., uplink or downlink) for a flow and does not receive a corresponding refresh message from any of the non-anchors at the expiration of the AgeOut timer, the anchor removes the corresponding binding entry from its NAPT table and instructs all the member links (all non-anchors) to also remove the corresponding binding entry from their respective NAPT tables. This frees the translated port for use by another, active, flow of traffic.

Dynamic NAPT binding add/delete, including translated port allocate/free, can be done by either (A) a centralized control plane, or (B) anchor plane in case of distributed system.

In the following, example methods for use by the anchor are described with reference to the flow diagrams of FIGS. 5 and 6. Similarly, example methods for use by any non-anchor are described with reference to the flow diagrams of FIGS. 7 and 8.

Figure 5:
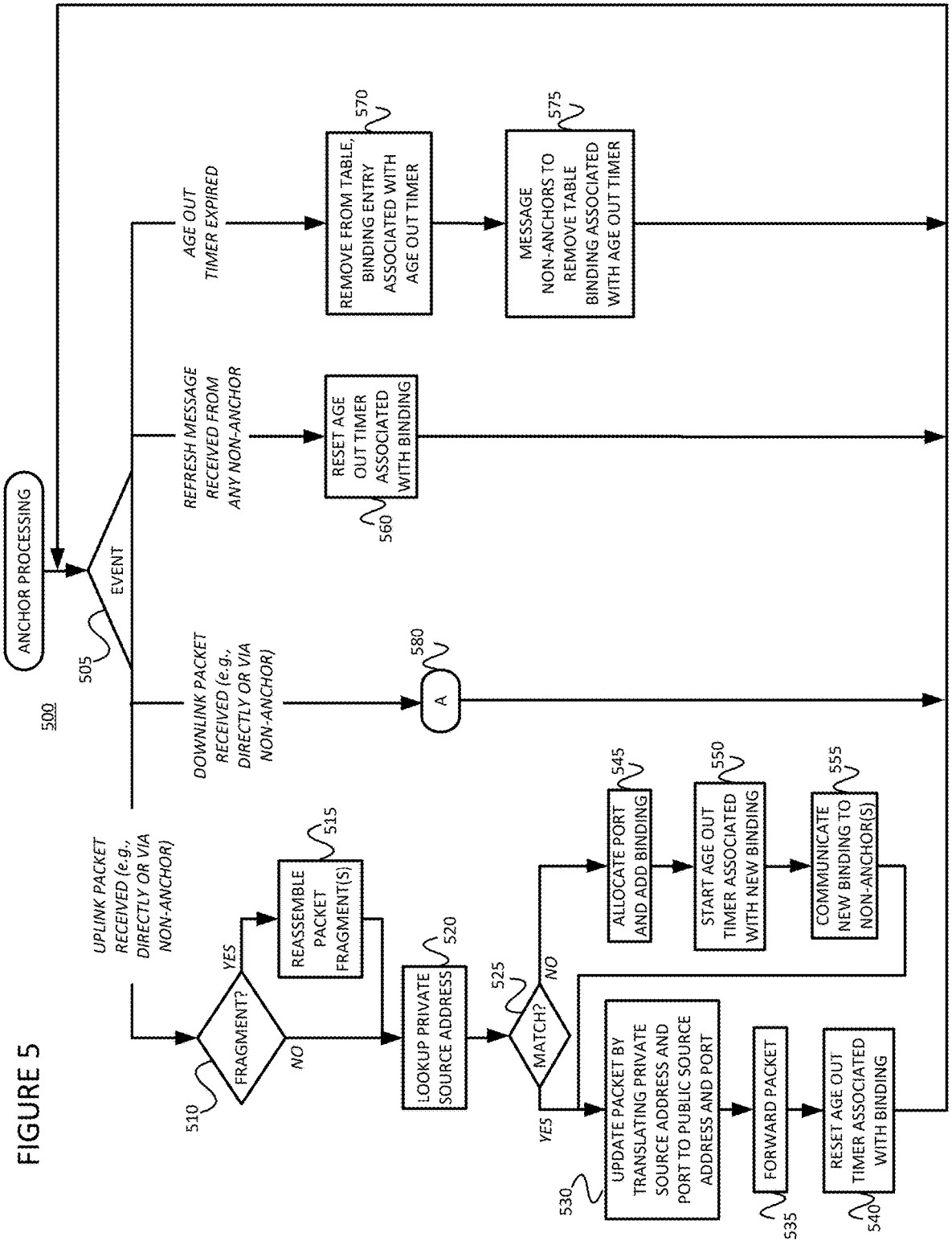
FIG. 5 is a flow diagram of an example method for performing NAPT by an anchor (defined in § 4.1 below).

FIG. 5 is a flow diagram of an example method 500, for use in a router servicing uplink and downlink traffic from member links belonging to an aggregated bundle of links, one of which links is an anchor and each of at least one of remaining links is a non-anchor, for providing Network Address and Port Translation (NAPT). The method 500 of FIG. 5 is performed by the anchor. Different branches of the example method 500 are performed responsive to the occurrence of different events or conditions. (See event branch point 505.)

Referring first to the left-most branch, responsive to receiving, by the anchor, an uplink packet having a source IP address, the example method 500 determines, by the anchor, whether or not a translation table of the anchor has a binding entry associated with the source IP address of the uplink packet. (Block 520) Responsive to determining that the translation table of the anchor has a binding entry associated with the source IP address of the uplink packet (525=YES), the example method 500 translates, by the anchor, the source IP address and a source port number of the uplink packet to a public source IP address and a new source port number from the binding entry, to generate an updated packet (Block 530), (2) forwards, by the anchor, the updated packet towards its destination (Block 535), and (3) resets an "AgeOut" timer associated with the binding entry (Block 540), before the example method 500 returns to event branch point 505. Referring back to decision 525, responsive to determining that the translation table of the anchor does not have a binding entry associated with the source IP address of the packet (decision 525=NO), the example method 500 (1) allocates, by the anchor, a new port number and a public source IP address to the source IP address of the uplink packet and stores in the translation table of the anchor, a new binding entry associating the source IP address of the uplink packet with the allocated port number and public source IP address (Block 545), (2) starts an "AgeOut" timer associated with the new binding entry (Block 550), (3) communicates the new binding entry to each of the at least one non anchor (Block 555), (4) translates, by the anchor, the source IP address and a source port number of the packet to the public source IP address and the port number from the new binding entry, to generate an updated packet (Block 530), (5) forwards, by the anchor, the updated packet towards its destination (Block 535), and (6) resets the "AgeOut" timer associated with the new binding entry (Block 540), before the example method 500 returns to event branch point 505.

Referring next to the second-from-left branch, responsive to receiving a downlink packet, the example method performs a series of steps denoted by node A 580, the details of which are described later, with reference to FIG. 6.

Referring next to the second-from-right branch of the flow diagram of FIG. 5, responsive to the anchor receiving a refresh message associated with the binding entry (e.g., from a non-anchor), the example method 500 resets the "AgeOut" timer associated with the binding entry (Block 560), before the example method 500 returns to event branch point 505. (This is because the flow corresponding to the binding entry is considered as being active.)

Finally, referring to the right-most branch of the flow diagram of FIG. 5, responsive to determining that the "AgeOut" timer of the binding entry has expired, the example method 500 (1) removes the binding entry from the translation table of the anchor (Block 570), and (2) communicates, to each of the at least one non-anchor, that its local instance of the binding entry should be removed from its local translation table (Block 575), before the example method 500 returns to event branch point 505. (This allows an unused address and/or port to be available for reallocation.)

Note that if the anchor receives a packet fragment (Decision 510=YES), then the example method 500 reassembles the packet fragment(s) (Block 515).

Figure 6:
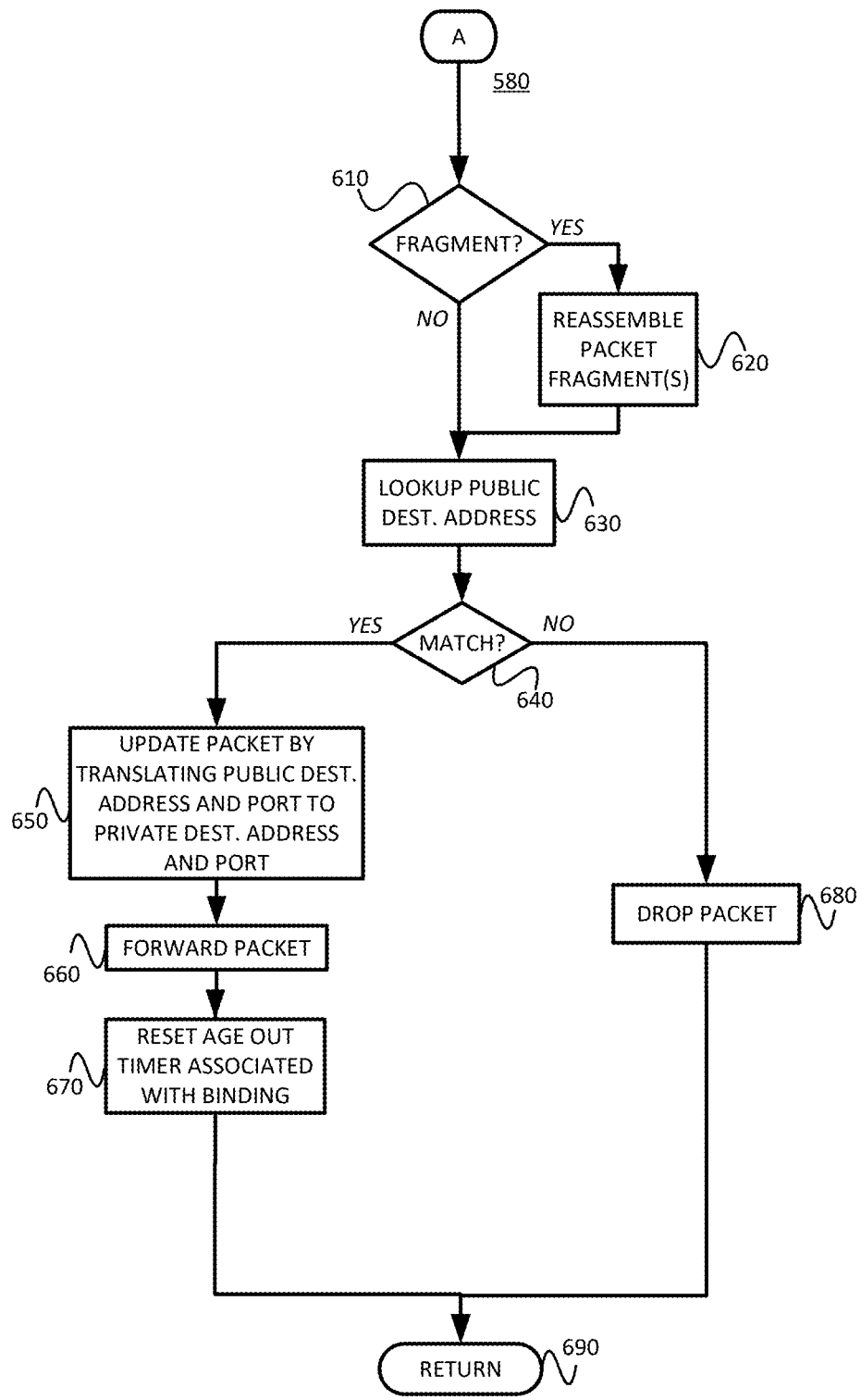
FIG. 6 is a flow diagram of an example method for performing NAPT on downlink traffic by an anchor.

FIG. 6 is a flow diagram of an example method 580. (Recall node A 580 from FIG. 5.) The example method 580 determines, by the anchor, whether or not a translation table of the anchor has a binding entry associated with the public destination IP address of the downlink packet. (Block 630) Responsive to determining that the translation table of the anchor has a binding entry associated with the public destination IP address of the downlink packet (640=YES), the example method 580 translates, by the anchor, the public destination IP address and a destination port number of the downlink packet to a corresponding private destination IP address and private destination port number from the binding entry, to generate an updated packet (Block 650), (2)

forwards, by the anchor, the updated packet towards its private destination (Block 660), and (3) resets an "AgeOut" timer associated with the binding entry (Block 670), before the example method 580 returns, via return node 690, to the event branch point 505 of FIG. 5. Referring back to 640, responsive to determining that the translation table of the anchor does not have a binding entry associated with the public destination IP address of the downlink packet (640=NO), the example method 580 drops the packet (Block 680), before the example method 580 returns, via return node 690, to the event branch point 505 of FIG. 5.

Note that if the anchor receives a packet fragment (Decision 610=YES), then the example method 580 reassembles the packet fragment(s) (Block 620).

Figure 7:
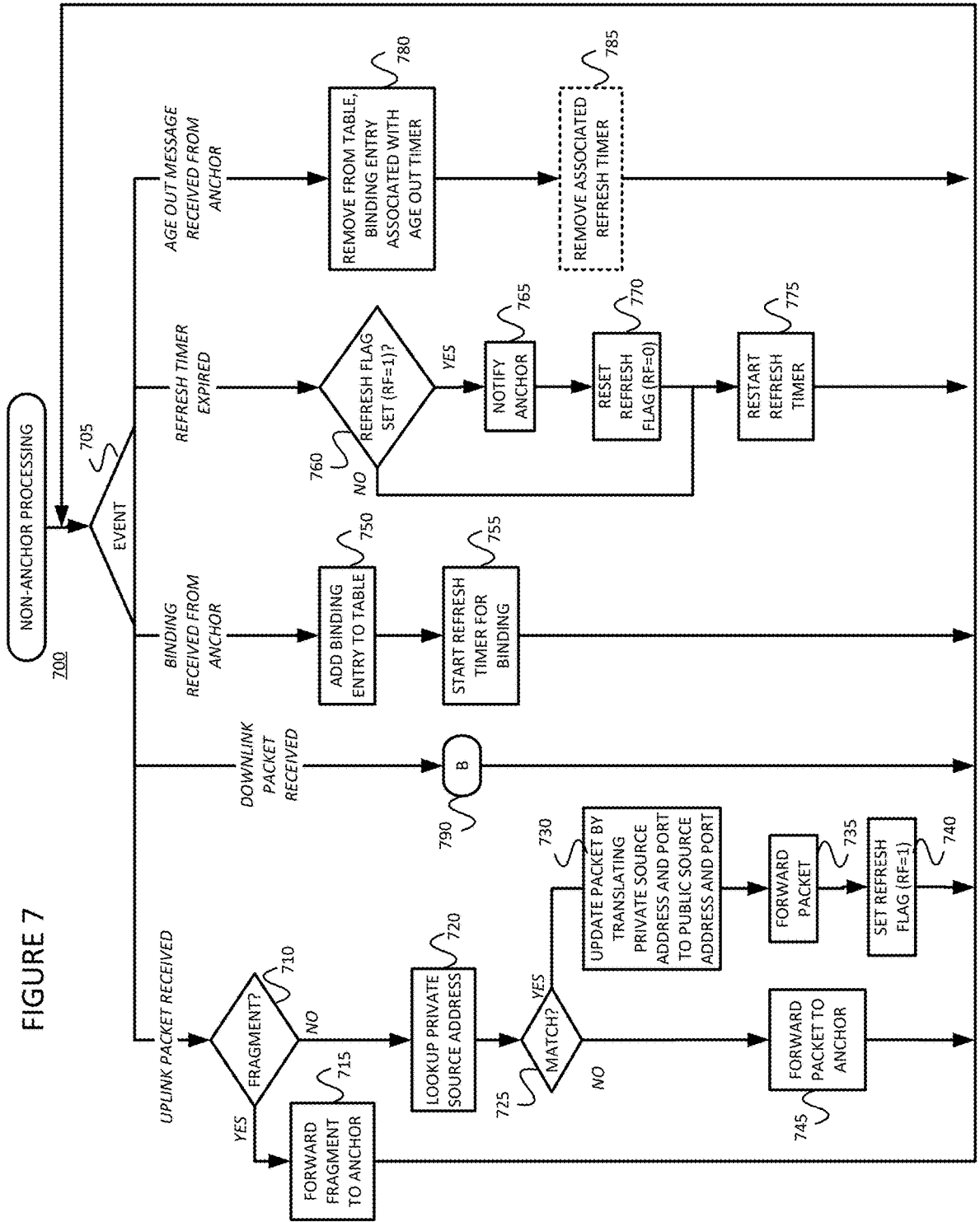
FIG. 7 is a flow diagram of an example method for performing NAPT by a non-anchor (defined in § 4.1 below).

FIG. 7 is a flow diagram of an example method 700, for use in a router servicing uplink traffic from member links belonging to an aggregated bundle of links, one of which links is an anchor and each of at least one of remaining links is a non-anchor, a machine implemented method for providing Network Address and Port Translation (NAPT) by a non-anchor. Different branches of the example method 700 are performed responsive to the occurrence of different events or conditions. (See event branch point 705.)

Referring first to the left-most branch, responsive to receiving, by the non-anchor, an uplink packet having a source IP address, the example method 700 determines, by the non-anchor, whether or not a translation table of the non-anchor has a binding entry associated with the source IP address of the uplink packet (Block 720). If, on the one hand, it is determined that the translation table of the non-anchor has a binding entry associated with the source IP address of the uplink packet (Decision 725=YES), the example method 700 then (1) translates, by the non-anchor, the source IP address and a source port number to a public source IP address and a new source port number from the binding entry, to generate an updated packet (Block 730), (2) forwards, by the non-anchor, the updated packet towards its destination (Block 735), and (3) sets a "refresh timer" flag (indicating an active flow) associated with the binding entry (Block 740), before the example method 700 returns to event branch point 705. Referring back to decision 725, if, on the other hand, it is determined that the translation table of the non-anchor does not have a binding entry associated with the source IP address of the packet (Decision 725=NO), the example method 700 forwards the packet to the anchor (Block 745), before the example method 700 returns to event branch point 705. (Recall that the left-most or second-from-left branch of the example method 500 of FIG. 5 is performed responsive to receiving an uplink or downlink packet, either directly or from a non-anchor, respectively.)

Note that if the non-anchor receives a packet fragment (Decision 710=YES), then the example method 700 forwards the packet fragment(s) to the anchor (Block 715). This allows the anchor to reassemble the packet fragment(s).

Referring next to the middle branch of the flow chart of FIG. 7, responsive to receiving, by the non-anchor, a binding entry from the anchor, the example method 700 (1) adds, by the non-anchor, the binding entry received to its translation table (Block 750), and (2) starts, by the non-anchor, a refresh timer associated with the binding entry (Block 755), before the example method 700 returns to event branch point 705.

Referring next to the second-from-right branch of the flow chart of FIG. 7, responsive to determining that the refresh timer associated with the binding entry has expired (wherein the refresh timer is shorter than an anchor "age out" timer associated with the binding entry), the example method 700 determines whether or not the "refresh timer" flag associated with the binding entry has been set. If, on the one hand, it is determined that the "refresh timer" flag associated with the binding entry has been set (Decision 760=YES), the example method 700 (1) notifies, by the non-anchor, the anchor that the "refresh timer" flag associated with the binding entry has been set (Block 765), (2) resets the "refresh timer" flag associated with the binding entry (Block 770), and (3) restarts the refresh timer flag associated with the binding entry (Block 775), before the method 700 returns to event branch point 705. (Referring back to block 560 of FIG. 5, this lets the anchor know that the flow remains active and that the information associated with the binding entry should not (yet) be released for reuse.) Referring back to decision 760, if, on the other hand, it is determined that the "refresh timer" flag associated with the binding entry has not been set (Decision 760=NO), the example method 700 restarts the "refresh timer" associated with the ending entry (Block 775), before the method 700 returns to event branch point 705. This restarts a refresh time period during which the non-anchor will check to see if it has received one or more packets belonging to a flow associated with the given binding entry.

Next, referring to the right-most branch of the flow diagram of FIG. 7, responsive to receiving from the anchor, the AgeOut message associated with the binding entry, the example method 700 removes the binding entry associated with the AgeOut message from the translation table of the non-anchor (Block 780), before the method 700 returns to event branch point 705. As shown, the refresh timer associated with the aged out binding entry may also be removed. (Block 785)

Finally, referring to the second-from-left branch of the flow diagram of FIG. 7, responsive to receiving a downlink packet, the example method performs a series of steps denoted by node B 790, the details of which are described below with reference to FIG. 8.

Figure 8:
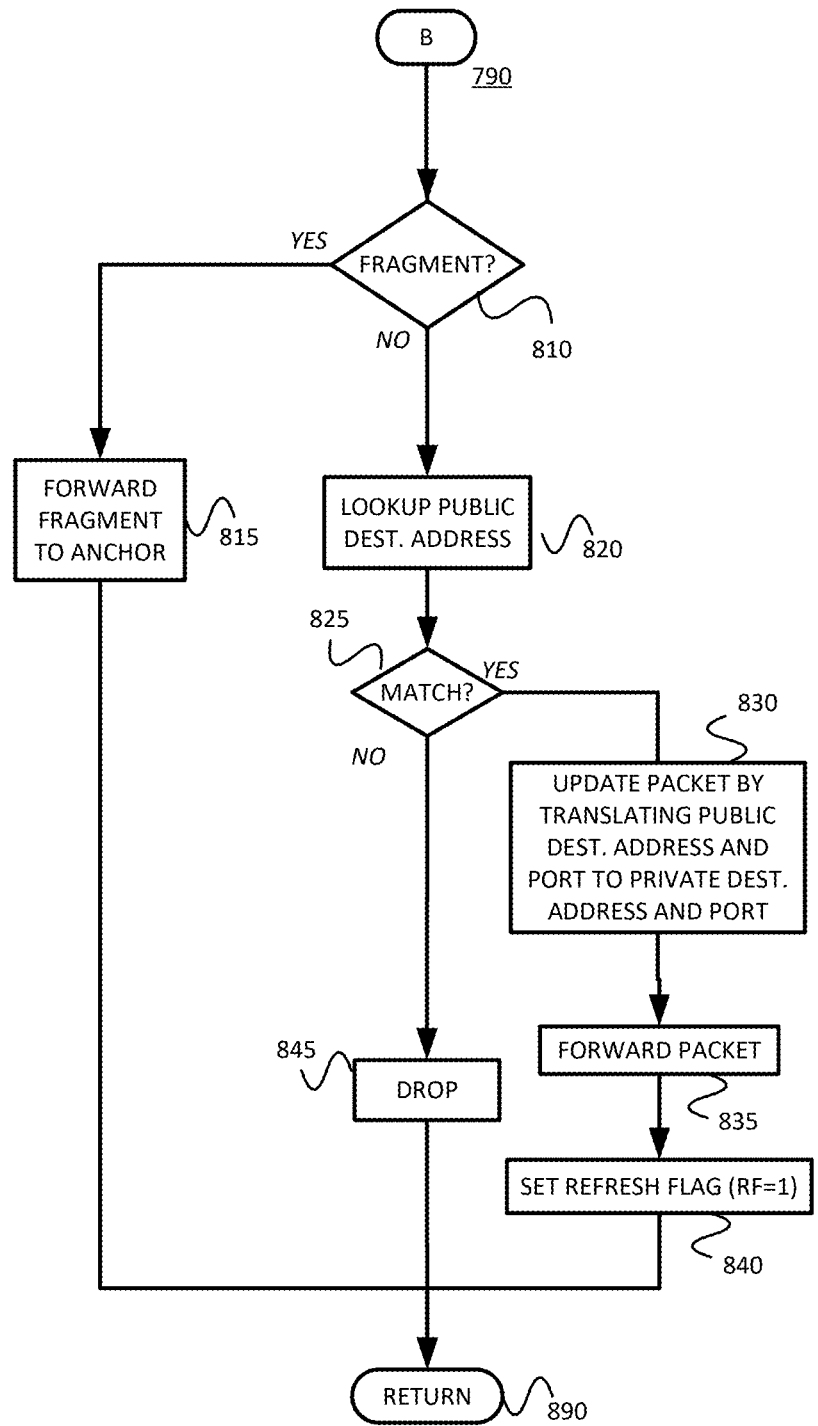
FIG. 8 is a flow diagram of an example method for performing NAPT on downlink traffic by an non-anchor.

FIG. 8 is a flow diagram of an example method 790. (Recall node B 790 from FIG. 7.) The example method 790 determines, by the non-anchor, whether or not a translation table of the non-anchor has a binding entry associated with the public destination IP address of the downlink packet (Block 820). If, on the one hand, it is determined that the translation table of the non-anchor has a binding entry associated with the public destination IP address of the downlink packet (Decision 825=YES), the example method 790 then (1) translates, by the non-anchor, the public destination IP address and a destination port number to a corresponding private destination IP address and a private destination port number from the binding entry, to generate an updated packet (Block 830), (2) forwards, by the non-anchor, the updated packet towards its destination (Block 835), and (3) sets a "refresh timer" flag associated with the binding entry (Block 840), before the example method 790 returns, via return node 890, to event branch point 705 of FIG. 7. Referring back to decision 825, if, on the other hand, it is determined that the translation table of the non-anchor does not have a binding entry associated with the public destination IP address of the downlink packet (Decision 825=NO), the example method 790 drops the packet (Block 845), before the example method 790 returns, via return node 890, to event branch point 705 of FIG. 7.

Note that if the non-anchor receives a packet fragment (Decision 810=YES), then the example method 790 forwards the packet fragment(s) to the anchor (Block 815). This allows the anchor to reassemble the packet fragment(s).

In any of the foregoing methods 500, 580, 700, 790, the router may be a single chassis router. If this is the case, the aggregated bundle of links may belong to a link aggregation group (LAG).

Alternatively, in any of the foregoing methods 500, 580, 700, 790, the router may be distributed across multiple chassis. If this is the case, the aggregated bundle of links may belong to a multi-chassis link aggregation group (MC LAG).

§ 4.4 Extensions, Alternatives, and/or Refinements

The example methods 500, 580, 700, 790 may be performed on a router, such as the routers 310/320 in FIG. 3 and the router 400 of FIG. 4. To the extent possible, any act of the methods should be performed in the forwarding plane (fast path). That is, the control plane (slow path) should be avoided to the extent possible. For example, referring back to FIG. 4, dynamic NAPT by an anchor or non-anchor may be performed by one or more lookup blocks 444 (e.g., ASICs) of a linecard 440/480.

Although the refresh timer may be less than the age out timer, it's value should be determined based on how quickly public IP addresses should be released versus how much refresh messaging is desired between the non-anchor(s) and the anchor. In one example embodiment, the length of the refresh timer is one-third the length of the age out timer, but this relationship can be different. The refresh timer for a given binding entry can be reset anytime the non-anchor receives traffic for the flow associated with the binding entry. That is, if a non-anchor member link receives traffic for a given flow from any direction within a Refresh interval, a refresh message for the binding entry corresponding to the flow may be sent to the anchor. If the anchor does not receive a refresh message associated with a given binding from a non-anchor and does not itself receive traffic associated with the given binding during an AgeOut interval, the anchor ages out the corresponding binding by removing the binding entry and instructing the non-anchor member links to remove the binding entry.

On failover of any link, traffic switches over to another member link of the group or bundle.

Figure 9:
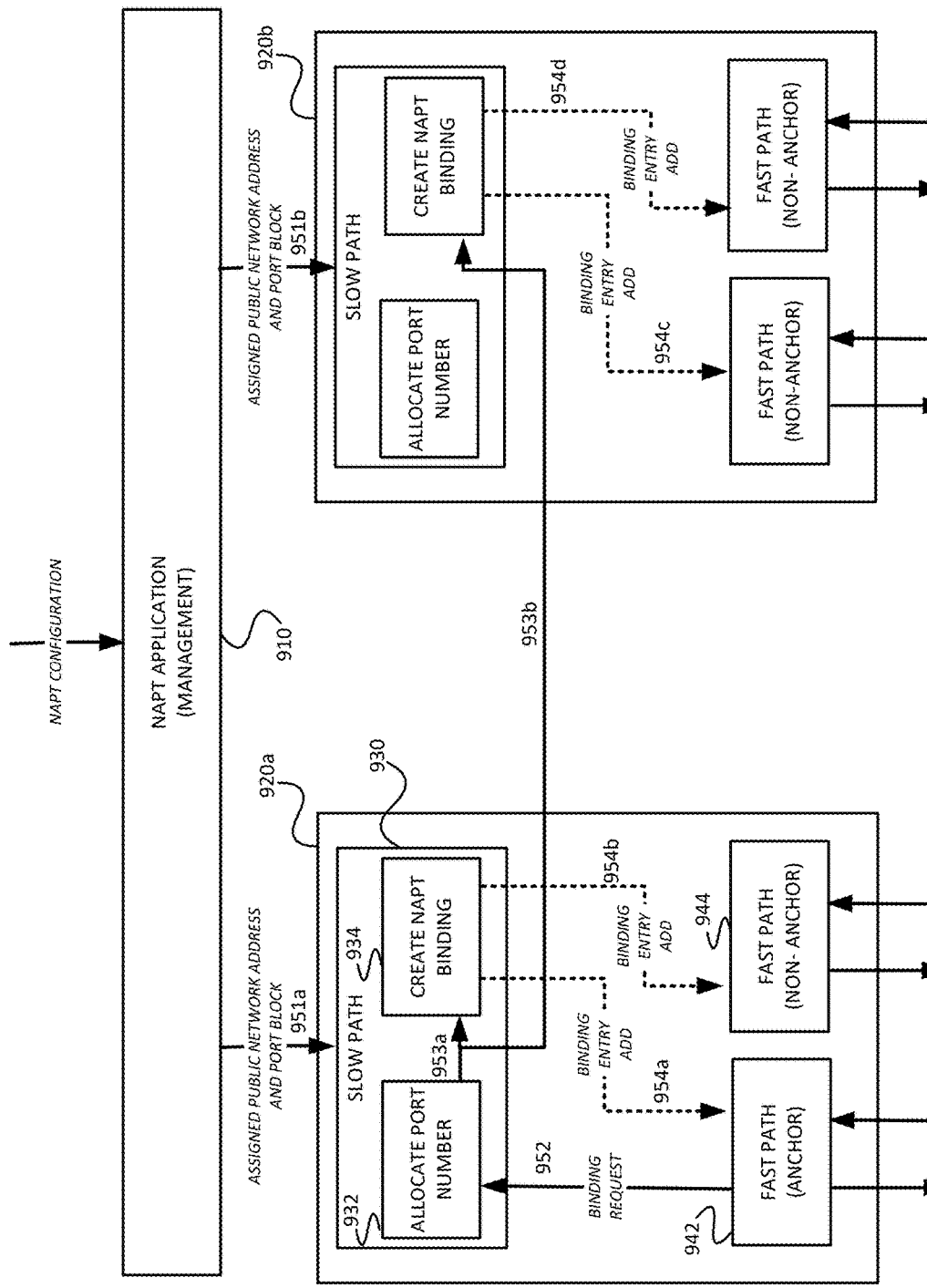
FIG. 9 is a block diagram of a system on which NAPT may be performed.

FIG. 9 is an example system 900 which may implement any of the example methods described above. The system 900 may be configured by a NAPT application 910, which assigns public network address(es) and a port block for a subscriber (or simply for a set of links, such as an aggregated bundle of links) 920. (The NAPT application may be provided, for example, in the control plane or routing engine of a router.) Two line cards, 920a and 920b, receive the public network address(es) and port block 951a and 951b, respectively, from the NAPT application 910. A NAPT application 930 on slow path (e.g., a general purpose microprocessor on the line card 920a) has a module 932 which allocates the port from its pool and a module 934 which creates NAPT bindings on all the fast path member links. The NAPT application 930 on slow path can be provided on a centralized control plane, and/or can be a distributed one running on separate nodes. A fast path portion (e.g., an ASIC(s) on the line card 920a) includes an anchor 942 and one or more non-anchors 944. The fast path components are responsible for data path forwarding. They perform NAPT translation without involving slow path (to the extent possible). Each fast path has a mechanism to forward traffic to other fast path nodes. (Recall, e.g., blocks 715 and 745 of FIG. 7.) Further, the anchor 942 is configured to send notifications to slow path only if a NAPT binding entry is not present. (See, e.g., binding request 952 from anchor 942 to module for allocating port number 932 in slow path 930, and recall, e.g., block 545 of FIG. 5.) When the allocate port number module 932 receives the request 952, it sends the port number 953a/953b to create NAPT binding modules 934. The create NAPT biding modules 934 send messages to add binding entries 954a-954d to respective fast path anchor 942 and non-anchors 944. Note that as the functionality of fast path improves (e.g., due to improved and more advanced ASICs, fast path can assume at least some of the functions performed by slow path.

Regarding the NAPT anchor 942, one of the links of the set of links is selected as anchor. The NAPT binding entry preferably has an indirect reference to its anchor. Such an indirect reference allows point change operation for anchor.

Dynamic binding creation is supported. For example, if a NAPT binding entry is not present in the member link's data path, the uplink packet is forwarded to anchor. (Recall, e.g., block 745 of FIG. 7.) The anchor then triggers NAPT binding creation by allocating port and configures NAPT bindings for both directions on all the member links. (Recall, e.g., blocks 545 and 555 of FIG. 5, as well as 942, 932 and 934 of FIG. 9.) A binding can be created by a centralized control plane and/or distributed control plane running on all the members nodes.

Once a binding is created on member link, subsequent packets are translated inline on the member link itself, without forwarding to any other service device. (Recall, e.g., blocks 530 and 535 of FIG. 5, blocks 650 and 660 of FIG. 6, blocks 730 and 735 of FIG. 7, and blocks 830 and 835 of FIG. 8.)

Fragmented traffic is forwarded to anchor to retain the integrity of the packet. (Recall, e.g., block 715 of FIG. 7 and block 815 of FIG. 8.)

Bindings that are unused for a given period of time are aged out so that they may be reused. There are two time intervals—AgeOut Interval, and Refresh Interval. The refresh interval is less than (e.g., one third of) the AgeOut interval. If a non-anchor member link receives traffic the from any direction in a refresh interval, a refresh message is sent to anchor for corresponding entry. (Recall, e.g., blocks 740, and 765 of FIG. 7, and block 840 of FIG. 8.) If the anchor doesn't receive refresh message from a non-anchor or traffic on anchor itself during an AgeOut interval, it ages out the corresponding binding by removing the binding entry from all the member links and freeing the port. (Recall, e.g., blocks 540, 560, 570 and 575 of FIG. 5, and block 670 of FIG. 6.

In the event of link failure, traffic switches to another member link of the set of links. Since NAPT binding present (and synchronized) on the all the member links, address and port are translated and traffic is forwarded without any packet loss. If an anchor link fails, a link in the set of links (link group) is selected as a new anchor link.

§ 4.5 Conclusions

Although state is replicated across anchor and non-anchors associated with a set (e.g., bundle or group) of links, most routers now have sufficient ASIC memory, so this replication of state should not cause any problems. Further, example embodiments consistent with the present description save power and rack space relative to separate or dedicated NAPT devices. Furthermore, to the extent that the example method(s) can be performed in the forwarding plane, they can provide NAPT on the fast path, at speeds at or approaching line speed.

The use of refresh timers and AgeOut timers permits public IP addresses and new ports to be used as needed, and provided for reuse.

Example embodiments consistent with the present invention are useful for providing NAPT in broadband edge, business edge, and/or mobile edge deployments.

Example embodiments consistent with the present description are useful for providing NAPT in stand-alone, chassis-based systems, as well as distributed (e.g., cloud-native) systems.

What is claimed is:

1. For use in a router servicing traffic from member links belonging to an aggregated bundle of links, one of which links is an anchor and each of at least one of remaining links is a non-anchor, a machine-implemented method for providing Network Address and Port Translation (NAPT), the machine-implemented method comprising:
   a) receiving, by the anchor, an outbound packet having a source IP address;
   b) responsive to receiving the packet, determining, by the anchor, whether or not a translation table of the anchor has a binding entry associated with the source IP address of the packet; and
   c) responsive to determining that the translation table of the anchor has a binding entry associated with the source IP address of the packet,
      1) translating, by the anchor, the source IP address and a source port number of the packet to a public source IP address and a new source port number from the binding entry, to generate an updated packet,
      2) forwarding, by the anchor, the updated packet towards its destination, and
      3) resetting an "age out" timer associated with the binding entry, and otherwise, responsive to determining that the translation table of the anchor does not have a binding entry associated with the source IP address of the packet,
      1) allocating, by the anchor, a port number and a public source IP address to the source IP address of the packet,
      2) storing in the translation table of the anchor, a new binding entry associating the source IP address of the packet with the allocated port number and public source IP address,
      3) starting an "age out" timer associated with the new binding entry,
      4) communicating the new binding entry to each of the at least one non-anchor, 5) translating, by the anchor, the source IP address and a source port number of the packet to the public source IP address and the port number from the new binding entry, to generate an updated packet,
      6) forwarding, by the anchor, the updated packet towards its destination, and
      7) resetting the "age out" timer associated with the new binding entry.

2. The machine-implemented method of claim 1, further comprising:
   d) determining that the "age out" timer of the binding entry has expired; and
   e) responsive to determining that the "age out" timer of the binding entry has expired,
      1) removing the binding entry from the translation table of the anchor, and
      2) communicating to each of the at least one non-anchor that its local instance of the binding entry should be removed from its local translation table.

3. The machine-implemented method of claim 1, further comprising:
   d) determining that the "age out" timer of the new binding entry has expired; and
   e) responsive to determining that the "age out" timer of the new binding entry has expired,
      1) removing the new binding entry, and
      2) communicating to each of the at least one non-anchor that its local instance of the new binding entry should be removed from its local translation table.

4. The machine-implemented method of claim 1 further comprising:
   d) receiving, by the anchor, from any one of the at least one non-anchors, a refresh message associated with the binding entry; and
   e) responsive to receiving the refresh message associated with the binding entry,
      1) resetting the "age out" timer associated with the binding entry.

5. The machine-implemented method of claim 1 further comprising:
   d) receiving, by the anchor, from any one of the at least one non-anchors, a refresh message associated with the new binding entry; and
   e) responsive to receiving the refresh message associated with the new binding entry,
      1) resetting the "age out" timer associated with the new binding entry.

6. The machine-implemented method of claim 1, further comprising:
   d) receiving, by the anchor, an inbound packet;
   e) responsive to receiving the inbound packet, determining, by the anchor, whether or not a translation table of the anchor has a binding entry associated with the destination IP address of the inbound packet; and
   f) responsive to determining that the translation table of the anchor has a binding entry associated with the destination IP address of the inbound packet,
      1) translating, by the anchor, the destination IP address and destination port number of the inbound packet to a private destination IP address and a new port number from the binding entry, to generate an updated packet,
      2) forwarding, by the anchor, the updated packet towards its destination, and
      3) resetting an "age out" timer associated with the binding entry, and otherwise, responsive to determining that the translation table of the anchor does not have a binding entry associated with the destination IP address of the packet,
      dropping the inbound packet.

7. The machine-implemented method of claim 1, wherein if the anchor receives a packet fragment, further:
   reassembling, by the anchor, the packet fragment.

8. The machine-implemented method of claim 1, the router is either (A) a single chassis router, and the aggregated bundle of links belong to a link aggregation group (LAG), or (B) a router is distributed across multiple chassis, and the aggregated bundle of links belong to a multi-chassis link aggregation group (MC-LAG).

9. For use in a router servicing traffic from member links belonging to an aggregated bundle of links, one of which links is an anchor and each of at least one of remaining links is a non-anchor, a machine-implemented method for providing Network Address and Port Translation (NAPT), the machine-implemented method comprising:

a) receiving, by a non-anchor, an outbound packet having a source IP address;
b) responsive to receiving the packet, determining, by the non-anchor, whether or not a translation table of the non-anchor has a binding entry associated with the source IP address of the packet; and
c) responsive to determining that the translation table of the non-anchor has a binding entry associated with the source IP address of the packet,
  1) translating, by the non-anchor, the source IP address and a source port number to a public source IP address and a new source port number from the binding entry, to generate an updated packet,
  2) forwarding, by the non-anchor, the updated packet towards its destination, and
  3) setting a "refresh timer" flag associated with the binding entry, and otherwise, responsive to determining that the translation table of the non-anchor does not have a binding entry associated with the source IP address of the packet, forwarding the packet to the anchor.

10. The machine-implemented method of claim 9, further comprising:
d) receiving, by the non-anchor, a binding entry from the anchor; and
e) responsive to receiving the binding entry from the anchor,
  1) adding, by the non-anchor, the binding entry received to its translation table, and
  2) starting, by the non-anchor, a refresh timer associated with the binding entry.

11. The machine-implemented method of claim 10, further comprising:
f) determining that the refresh timer associated with the binding entry has expired, wherein the refresh timer is shorter than an anchor "age out" timer associated with the binding entry; and
g) responsive to determining that the refresh timer associated with the binding entry has expired,
  1) determining whether or not the "refresh timer" flag associated with the binding entry has been set, and
  2) responsive to determining that the "refresh timer" flag associated with the binding entry has been set,
    A) notifying, by the non-anchor, the anchor that the "refresh timer" flag associated with the binding entry has been set,
    B) resetting the that the "refresh timer" flag associated with the binding entry, and
    C) restarting the refresh timer flag associated with the binding entry,
  and otherwise, responsive to determining that the "refresh timer" flag associated with the binding entry has not been set, restarting the "refresh timer" associated with the ending entry.

12. The machine-implemented method of claim 9, further comprising:
d) receiving by the non-anchor, from the anchor, an age out message associated with the binding entry; and
e) responsive to receiving from the anchor, the age out message associated with the binding entry, removing, the binding entry associated with the age out message from the translation table of the non-anchor.

13. The machine-implemented method of claim 12, further comprising:
f) removing the refresh timer associated with the binding entry associated with the age out message.

14. The machine-implemented method of claim 9, further comprising:
d) receiving, by the non-anchor, an inbound packet;
e) responsive to receiving the inbound packet, determining, by the non-anchor, whether or not a translation table of the non-anchor has a binding entry associated with the destination IP address of the inbound packet; and
f) responsive to determining that the translation table of the non-anchor has a binding entry associated with the destination IP address of the inbound packet,
  1) translating, by the non-anchor, the destination IP address and destination port number of the inbound packet to a private destination IP address and a new port number from the binding entry, to generate an updated packet,
  2) forwarding, by the non-anchor, the updated packet towards its destination, and
  3) setting a refresh flag, and
otherwise, responsive to determining that the translation table of the non-anchor does not have a binding entry associated with the destination IP address of the inbound packet, dropping the packet.

15. The machine-implemented method of claim 9, wherein if the non-anchor receives a packet fragment, further:
sending, by the non-anchor, the packet fragment to the anchor.

16. The machine-implemented method of claim 9, wherein the router is either (A) a single chassis router, and the aggregated bundle of links belong to a link aggregation group (LAG), or (B) a router is distributed across multiple chassis, and the aggregated bundle of links belong to a multi-chassis link aggregation group (MC-LAG).

17. A router configured to service traffic from member links belonging to an aggregated bundle of links, the router comprising:
a) an anchor associated with one of the member links and having at least one processor and storage; and
b) at least one non-anchor, each of which is associated with another of the member links and having at least one processor and storage,
wherein the anchor is configured to provide Network Address and Port Translation (NAPT) by performing a method including,
1) receiving, by the anchor, an outbound packet having a source IP address;
2) responsive to receiving the packet, determining, by the anchor, whether or not a translation table of the anchor has a binding entry associated with the source IP address of the packet; and
3) responsive to determining that the translation table of the anchor has a binding entry associated with the source IP address of the packet,
  A) translating, by the anchor, the source IP address and a source port number of the packet to a public source IP address and a new source port number from the binding entry, to generate an updated packet,
  B) forwarding, by the anchor, the updated packet towards its destination, and
  C) resetting an "age out" timer associated with the binding entry, and otherwise, responsive to determining that the translation table of the anchor does not have a binding entry associated with the source IP address of the packet, A) allocating, by the anchor, a port number and a public source IP address to the source IP address of the packet,
B) storing in the translation table of the anchor, a new binding entry associating the source IP address of the packet with the allocated port and public source IP address,
C) starting an "age out" timer associated with the new binding entry,
D) communicating the new binding entry to each of the at least one non-anchor, E) translating, by the anchor, the source IP address and a source port number of the packet to the public source IP address and the port number from the new binding entry, to generate an updated packet,
F) forwarding, by the anchor, the updated packet towards its destination, and
G) resetting the "age out" timer associated with the new binding entry, and
wherein the each of the at least one non-anchor is configured to provide NAPT by performing a method including
1) receiving, by the non-anchor, a second outbound packet having a second source IP address;
2) responsive to receiving the second packet, determining, by the non-anchor, whether or not a translation table of the non-anchor has a binding entry associated with the second source IP address of the second packet; and
3) responsive to determining that the translation table of the non-anchor has a binding entry associated with the second source IP address of the second packet,
　A) translating, by the non-anchor, the second source IP address and a source port number of the second packet to a second public source IP address and a second new source port number from the binding entry, to generate a second updated packet,
　B) forwarding, by the non-anchor, the second updated packet towards its destination, and
　C) setting a "refresh timer" flag associated with the binding entry, and otherwise, responsive to determining that the translation table of the non-anchor does not have a binding entry associated with the second source IP address of the second packet, forwarding the second packet to the anchor.

18. The router of claim 17 wherein the router is a single chassis router.

19. The router of claim 18, wherein the aggregated bundle of links belong to a link aggregation group (LAG).

20. The router of claim 17, wherein the router is distributed across multiple chassis, and the aggregated bundle of links belong to a multi-chassis link aggregation group (MC-LAG).

* * * * *